United States Patent
Kanda et al.

(10) Patent No.: US 8,283,867 B2
(45) Date of Patent: Oct. 9, 2012

(54) LIGHT SOURCE TURN-ON/OFF CONTROLLER

(75) Inventors: Takumi Kanda, Kyoto (JP); Junji Bandai, Kyoto (JP); Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 367 days.

(21) Appl. No.: 12/672,109

(22) PCT Filed: Jul. 4, 2008

(86) PCT No.: PCT/JP2008/062168
§ 371 (c)(1),
(2), (4) Date: Feb. 4, 2010

(87) PCT Pub. No.: WO2009/019945
PCT Pub. Date: Feb. 12, 2009

(65) Prior Publication Data
US 2011/0181197 A1    Jul. 28, 2011

(30) Foreign Application Priority Data

Aug. 7, 2007  (JP) ................................. 2007-205968
Oct. 23, 2007  (JP) ................................. 2007-275526

(51) Int. Cl.
*H05B 37/00*    (2006.01)
(52) U.S. Cl. ............................. 315/82; 315/83; 315/307
(58) Field of Classification Search ................... 315/77, 315/82, 83, 291, 185 R, 192, 307, 308
See application file for complete search history.

(56) References Cited

U.S. PATENT DOCUMENTS

| 5,465,029 | A | * | 11/1995 | Hanazaki et al. ............. 315/308 |
| 7,902,769 | B2 | * | 3/2011 | Shteynberg et al. .......... 315/291 |
| 2004/0150355 | A1 | | 8/2004 | Tani et al. |
| 2007/0120507 | A1 | | 5/2007 | Uchida et al. |

FOREIGN PATENT DOCUMENTS

| JP | 62-061853 | 3/1987 |
| JP | 62-064645 | 3/1987 |
| JP | 62-122842 | 6/1987 |
| JP | 07-164958 | 6/1995 |
| JP | 2003-347594 | 12/2003 |
| JP | 2004-235498 | 8/2004 |
| JP | 2005-349989 | 12/2005 |
| JP | 2007-106191 | 4/2007 |
| JP | 2007-145114 | 6/2007 |

* cited by examiner

*Primary Examiner* — David Hung Vu
(74) *Attorney, Agent, or Firm* — Fish & Richardson P.C.

(57) ABSTRACT

A light source turn-on/off controller includes an input section of a turn-on/off timing signal, a PWM signal generating section for generating a pulse signal responding to a rise or a fall of the timing signal, a duty cycle of the pulse signal changing so as to simulate a rise or a fall of emission in turn-on or turn-off of a filament, an emission control section for controlling an emitting section responding to the pulse signal from the PWM signal generating section, and a storage section for storing a control data table for duty cycle control by the PWM signal generating section. The control data table includes a rise table to be referred to in the rise of emission and a fall table to be referred to in the fall of emission, and each of the rise table and the fall table indicates association between elapsed time from the rise or the fall of the timing signal and the duty cycle of the pulse signal, and a relationship between the tables indicates that they cannot be superposed on each other.

6 Claims, 30 Drawing Sheets

FIG.3
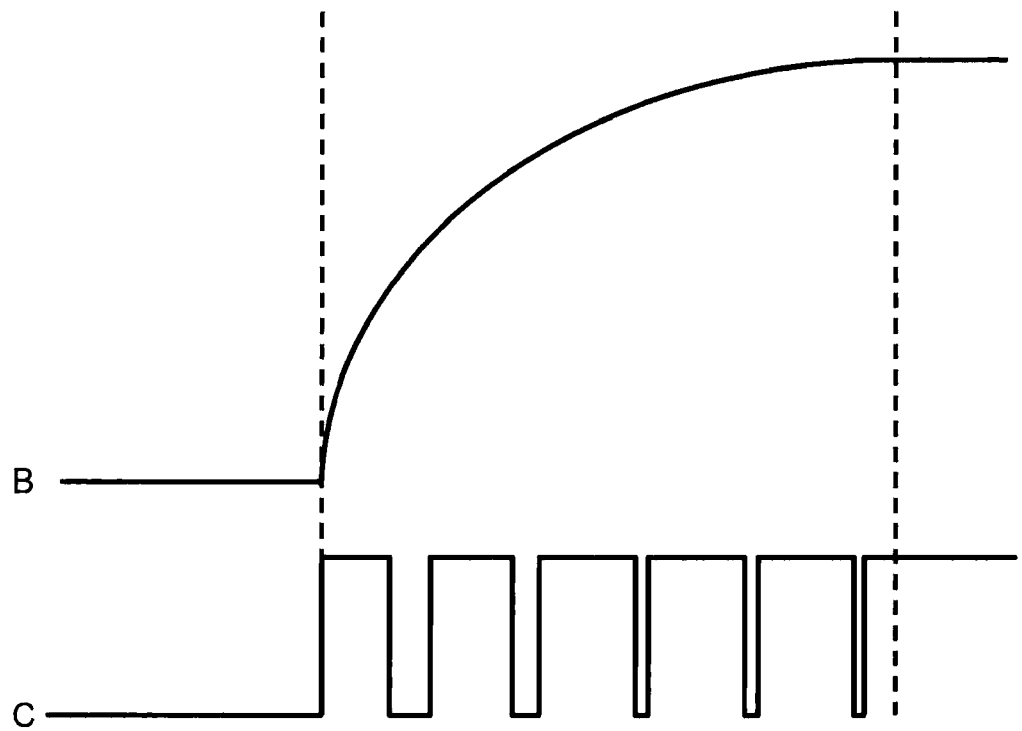
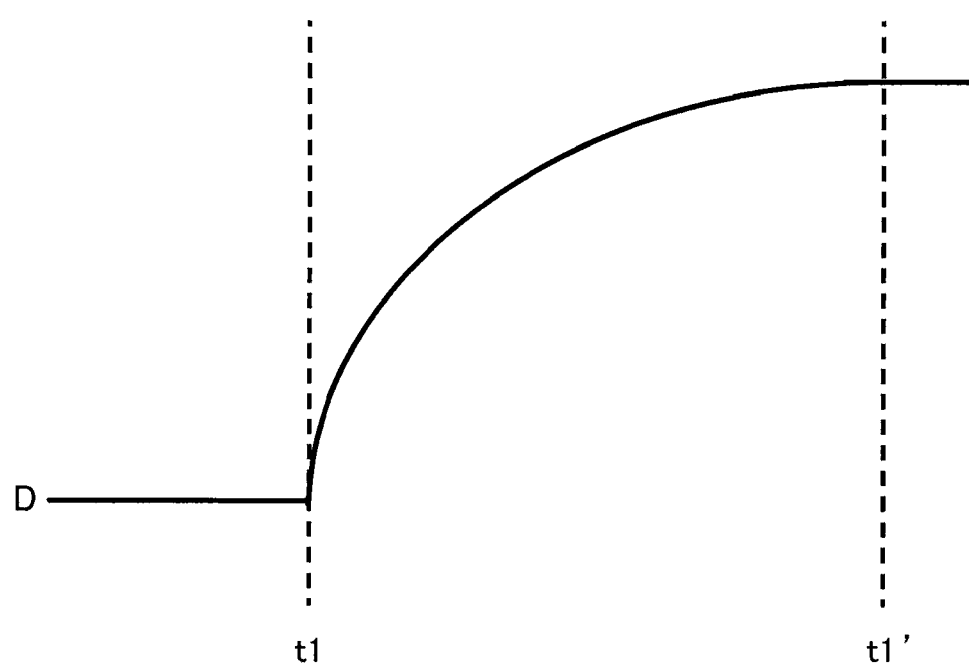
t1    t1'

FIG.23
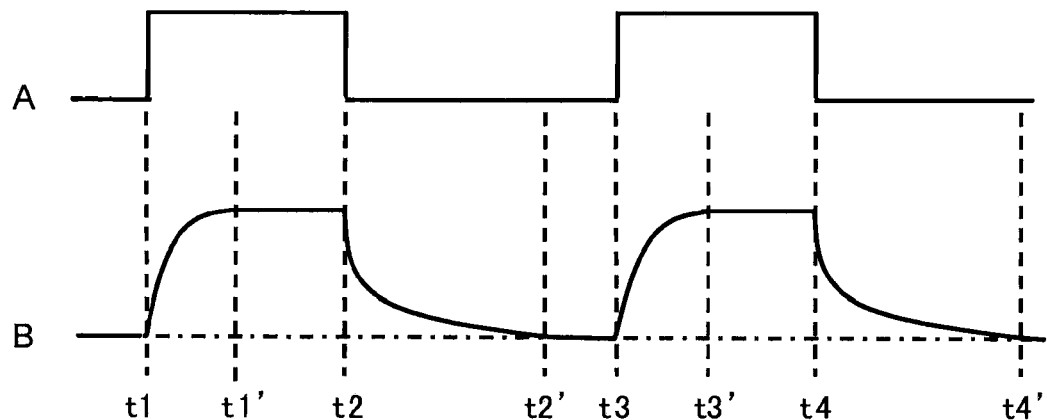
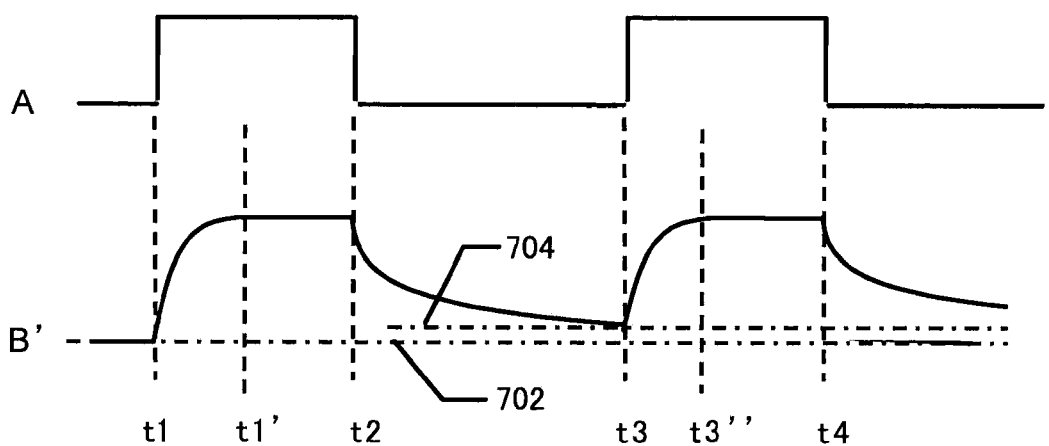
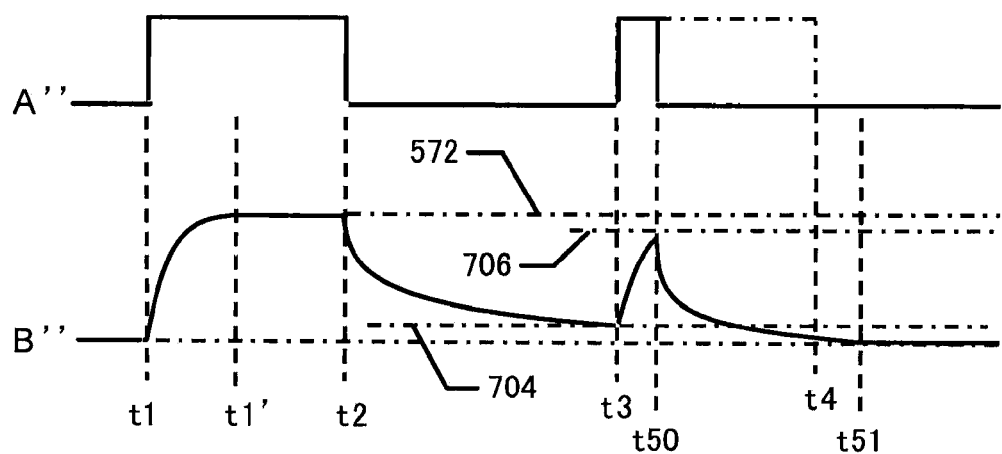

FIG.24
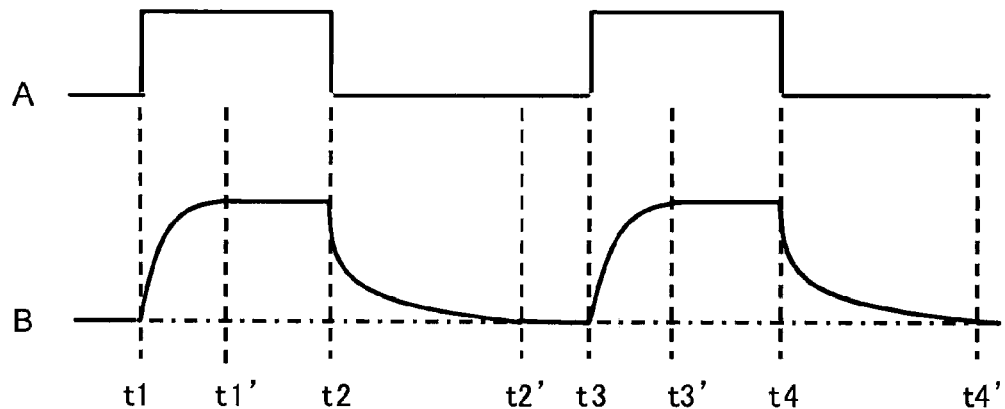
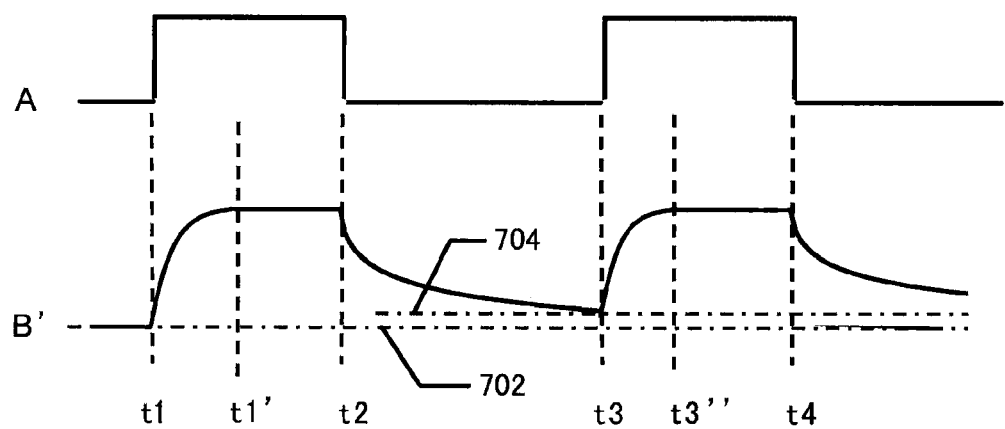
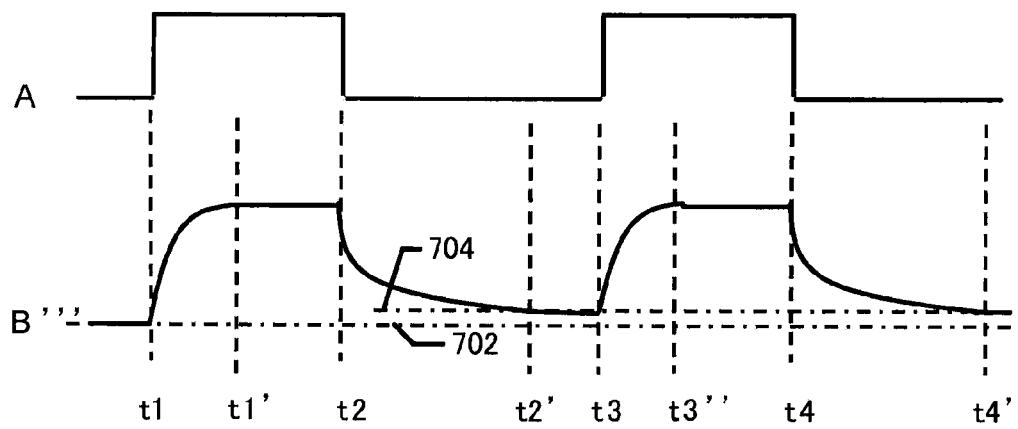

LIGHT SOURCE TURN-ON/OFF CONTROLLER

TECHNICAL FIELD

The present invention relates to a turn-on/off controller of a light source.

BACKGROUND ART

Conventionally, a bulb lamp has been used as a light source for a vehicle or the like. Recent years, however, luminance intensity of LEDs has become high level so that LEDs are used for a headlight, a winker or the like. In addition, LEDs have become commonly used for a traffic signal, too.

On the other hand, when LEDs are used as a light source, it should be noted that the light emission characteristic thereof is different from that of a conventional bulb lamp. Therefore, the control timing has been studied also in the case where the LED and the bulb lamp are mixed as a light source.

Further, it has been also studied to change the duty ratio and period in accordance with an input signal so as to supply the LED with current corresponding to a pulse width modulated pulse signal. Thus, the luminance change characteristic of the LED becomes nonlinear, so as to be similar to the luminance change characteristic of the bulb lamp.

Patent Document 1: JP-A-7-164958
Patent Document 2: JP-A-2004-235498
Patent Document 3: JP-A-2007-106191

DISCLOSURE OF THE INVENTION

Problem to be Solved by the Invention

However, in order to use the other light emission means as a light source than an incandescent lamp that has been used for many years, there are still many problems to be studied.

In view of the above description, it is an object of the present invention to provide a light source turn-on/off controller which enables to use light emission means other than the incandescent lamp as a light source without a feeling different from the incandescent lamp or the like.

Means for Solving the Problem

In order to achieve the above-mentioned object, the light source turn-on/off controller according to the present invention includes an input section of a turn-on/off timing signal, a PWM signal generating section for generating a pulse signal responding to a rise or a fall of the timing signal, a duty cycle of the pulse signal changing so as to simulate a rise or a fall of emission in turn-on or turn-off of a filament, an emission control section for controlling an emitting section responding to the pulse signal from the PWM signal generating section, and a storage section for storing a control data table for duty cycle control by the PWM signal generating section. The control data table includes a rise table to be referred to in the rise of emission and a fall table to be referred to in the fall of emission. Each of the rise table and the fall table indicates association between elapsed time from the rise or the fall of the timing signal and the duty cycle of the pulse signal. A relationship between the tables indicates that they cannot be superposed on each other.

Note that the light source turn-on/off controller according to the present invention can have various structures other than the above-described structure, and the various structures will be described later in detail.

Effects of the Invention

Using the light source turn-on/off controller according to the present invention, it is possible to use light emission means other than the incandescent lamp as a light source without a feeling different from the incandescent lamp or the like.

BRIEF DESCRIPTION OF THE DRAWINGS

FIG. 3 is a partially enlarged waveform diagram illustrating the operation of Example 1 in more detail.

FIG. 23 is a waveform diagram illustrating an operation of the winker controller of Example 7.

FIG. 24 is a waveform diagram illustrating an operation of the winker controller of Example 7 in another case.

Figure 1:
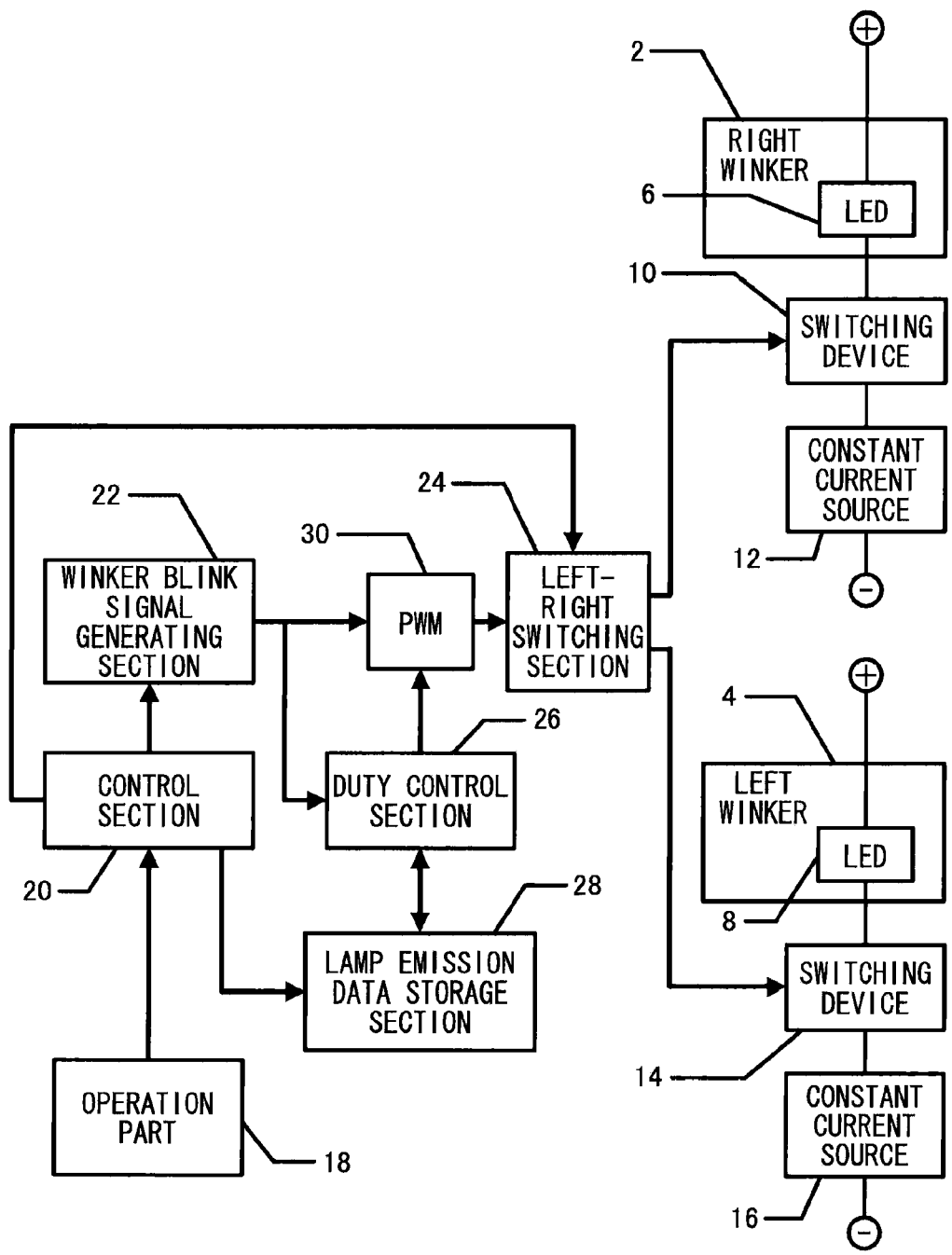
FIG. 1 is a block diagram illustrating Example 1 of a vehicle winker controller according to an embodiment of the present invention.

EXPLANATION OF NUMERALS 2 right winker
4 left winker
6, 8 LED
10, 14 switching device
12, 16 constant current source
18 operation part
20 control section
22 winker blink signal generating section
24 left-right switching section
26 duty control section
28 lamp emission data storage section
30 pulse width modulating section
102 integral circuit
202 bulb lamp
204 left winker side structure
206 left-right switching section
208 right door mirror
210 LED
212 switching device
214 constant current source
216 left door mirror side structure
302 LED
304 central zone LED group
306 center middle zone LED group
308 outer middle zone LED group
310 outer zone LED group
312, 314, 316, 318 switching device
320, 324, 326, 328 constant current source
330 delay control section
332, 334, 336, 338 left-right switching section
402 LED
404 first LED group
406 second LED group
408 third LED group
410 fourth LED group
412, 414, 416, 418 switching device
420, 422, 424, 426 constant current source
428 left-right switching section
430 first delay section
432 second delay section
434 third delay section
500 parking brake lamp control LSI
502 parking brake lamp
504 voltage stabilizing capacitor
506 current limiting resistor
508 switching transistor
510 parking lamp operation part
512 brake operation part
514 microcomputer
516 output circuit
518 capacitor
520 CPU
522 memory
524 lamp emission data table
528 input/output section
600 winker control LSI
602, 612 right winker, left winker
604, 614 voltage stabilizing capacitor
606, 616 current limiting resistor
608, 618 switching transistor
610, 620 output circuit
622 winker operation part
624 hazard lamp operation part
626 microcomputer

BEST MODE FOR CARRYING OUT THE INVENTION

FIG. 1 is a block diagram illustrating Example 1 of a vehicle winker controller according to an embodiment of the present invention. As light sources of a right winker 2 and a left winker 4, an LED 6 and an LED 8 are used respectively. The LED 6 of the right winker 2 is turned on when current is supplied from a constant current source 12 based on turned on and off of a switching device 10 such as a transistor. Similarly, the LED 8 of the left winker 4 is turned on when current is supplied from a constant current source 16 based on turned on and off of a switching device 14.

For the sake of simplicity, one LED 6 and one LED 8 are illustrated as the right winker 2 and the left winker 4, respectively, but actually a plurality of LEDs are provided as each of the right winker 2 and the left winker 4 for obtaining necessary light energy. The plurality of LEDs are controlled in the same manner as the LED 6 and the LED 8. In this case, the switching devices 10 and 14 and the constant current sources 12 and 16 are shared by the plurality of LEDs in the right winker 2 and the left winker 4, respectively. Alternatively, the switching device or the constant current source may be provided for each of the LEDs. In any case, in Example 1, the LEDs in the right winker 2 and the left winker 4 are respectively controlled integrally by control signals provided as inputs of the switching devices 10 and 14.

As described above, the LED is used as the light source in Example 1, but a bulb lamp having a filament has been used commonly as a light source of a winker. The bulb lamp emits light when the current is supplied to the filament to be heated and stops the light emission when the current supply is stopped so that the filament is cooled. Therefore, in variation of light energy thereof, light emission rises gradually and falls gradually too. In contrast, the LED has a quick change of light energy responding sharply to the start and the end of current supply. Therefore, in a use of blinking light emission like a winker in particular, the LED is stimulative compared with the familiar and relatively mild blink of the bulb lamp and has apparently different feeling from the same. If the apparent difference startles or irritates a driver as a bad psychological influence, there is no guarantee that it does not cause a traffic accident.

Therefore, in Example 1, the LED 6 and the LED 8 are controlled to blink with light energy variation simulating the rise and the fall of the light emission of the bulb lamp. Hereinafter, this light control will be described.

An operation part 18 includes an operation part for instructing blink of the left or the right winker, and a hazard blink operation part for blinking both the left and the right winkers simultaneously. For instance, if the blink of the right winker 2 is instructed by the operation part 18 when turning right, a control section 20 detects it and instructs a winker blink signal generating section 22 to generate a winker blink signal. This blinking signal is a rectangular wave signal that repeats high level and low level at a predetermined period (e.g., 1.5 seconds). The control section 20 controls a left-right switching section 24 simultaneously so that the winker blink signal is sent to the right winker 2.

The winker blink signal generating section 22 is also connected to a duty control section 26, so as to transmit rise timing and fall timing of the winker blink signal. The duty control section 26 refers to a data table (actual measurement data table of a rise characteristic and a fall characteristic of the light energy that is actually emitted from the bulb lamp) stored in a lamp emission data storage section 28 so as to change a duty cycle for controlling a pulse width modulating section 30. Thus, the blinking signal from the winker blink signal generating section 22 is converted into a control signal for controlling the LED 6 to emit light simulating the variation of light energy that is actually emitted from the bulb lamp by the pulse width modulating section 30 based on control by the duty control section 26, and the control signal is sent from the left-right switching section 24 to the switching device 10 of the right winker 2.

Specifically, the duty control section 26 responds to the rise timing of the winker blink signal so as to read out the rise characteristic data of the light energy emitted by the bulb lamp stored in the lamp emission data storage section 28, and changes the duty cycle continuously from a minimum value (e.g., zero percent) to a maximum value (e.g., 100 percent) in accordance with lapse time from the rise timing. Similarly, the duty control section 26 responds to the fall timing of the winker blink signal so as to read out the fall characteristic data of the lamp light energy stored in the lamp emission data storage section 28, and changes the duty cycle from the maximum value (e.g., 100 percent) to the minimum value (e.g., zero percent) in accordance with lapse time from the fall timing. The switching device 10 is turned on and off in accordance with such the control signal, and the LED 6 repeats the blink in such a manner to turn on relatively mildly and turn off gradually simulating the luminance change of the lamp emission stored in the lamp emission data storage section 28.

On the other hand, if the operation part 18 instructs the blink of the left winker 4 when turning left, the control section 20 detects this and switches the left-right switching section 24 so that the control signal generated by the winker blink signal generating section 22 and modulated by the pulse width modulating section 30 is sent to the switching device 14 of the left winker 4. The operation until the control signal is sent to the left-right switching section 24 is the same as the case of the above-described right winker blink.

In addition, if the operation part 18 instructs the hazard blink so that both the left and the right winkers blink simultaneously, the control section 20 detects this and switches the left-right switching section 24 so that the control signal generated by the winker blink signal generating section 22 and modulated by the pulse width modulating section 30 is sent simultaneously to the switching device 10 of the right winker 2 and the switching device 14 of the left winker 4. The operation until the control signal is sent to the left-right switching section 24 is the same as the case of the above-described right winker blink.

Further, in the vehicle winker controller having the above-described structure, the duty control section 26 and the lamp emission data storage section 28 correspond to a timing signal input section for inputting a turn-on/off timing signal. In addition, the duty control section 26, the lamp emission data storage section 28 and the pulse width modulating section 30 correspond to a emission control signal generating section which generates a control signal for controlling a light source other than a filament to emit light simulating rise or fall of light emission when turning on or off the filament responding to rise or fall of the timing signal. In addition, the switching devices 10 and 14 correspond respectively to a plurality of output sections for outputting the control signal of the emission control signal generating section. In addition, the left-right switching section 24 corresponds to a selection signal input section for inputting a selection signal for determining one of the plurality of output sections from which the control signal is delivered.

Figure 2:
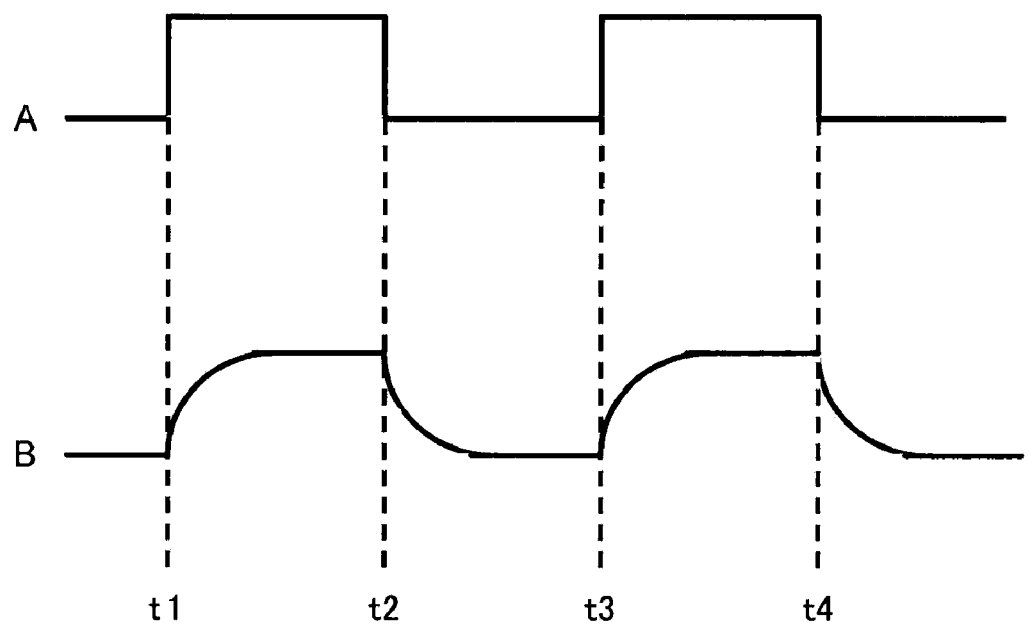
FIG. 2 is a waveform diagram illustrating an operation of Example 1.

FIG. 2 is a waveform diagram illustrating the above-described operation, in which the horizontal axis represents lapse time. One period (e.g., 1.5 seconds) of the blink is from t1 to t3, and t1 and t3 denote rise timings of the blink while t2 and t4 denote fall timings of the blink. The symbol A in FIG. 2 illustrates a waveform of the winker blink signal generated from the winker blink signal generating section 22. If this winker blink signal is directly supplied to the switching devices 10 and 14, the LEDs 6 and 8 will blink with a sharp luminance change similarly to symbol A in FIG. 2.

In contrast, symbol B in FIG. 2 illustrates a luminance change of the LEDs 6 and 8 in the case where the switching devices 10 and 14 are controlled by the structure of FIG. 1. This luminance change simulates the lamp emission having a rounded rise of the light emission and a gradual fall of the light emission. Thus, despite of using the LED as the light source, the winker repeats the blink with a luminance change similar to the lamp emission that is common and familiar.

FIG. 3 illustrates a detail of the state from the turn-on rise timing t1 until the luminance increases to the maximum value in one period of the blink when the LEDs 6 and 8 are controlled. Symbol B in FIG. 3 illustrates an enlarged part of the symbol B in FIG. 2 and indicates the luminance change of the LEDs 6 and 8 similarly to FIG. 2. Symbol C in FIG. 3 is a conceptual diagram of the output waveform of the pulse width modulating section 30 before and after the turn-on rise timing t1. The duty cycle is zero percent before t1, and the duty cycle changes to 100 percent in the period from t1 to t1'. In addition, symbol D in FIG. 3 illustrates a temporal change of the light energy for turn-on stored in the lamp emission data storage section 28. The change of the duty cycle (symbol C in FIG. 3) is carried on so that the luminance change of the LED (symbol B in FIG. 3) simulates the luminance change of the lamp (symbol D in FIG. 3). Qualitatively speaking, the duty cycle (symbol C in FIG. 3) increases rapidly after t1 and then approaches 100 percent mildly. Note that symbol C in FIG. 3 illustrates a concept of the change of the duty cycle, but a period of the waveform at an actual frequency (e.g., a few kilohertz) is too small to illustrate.

Figure 4:
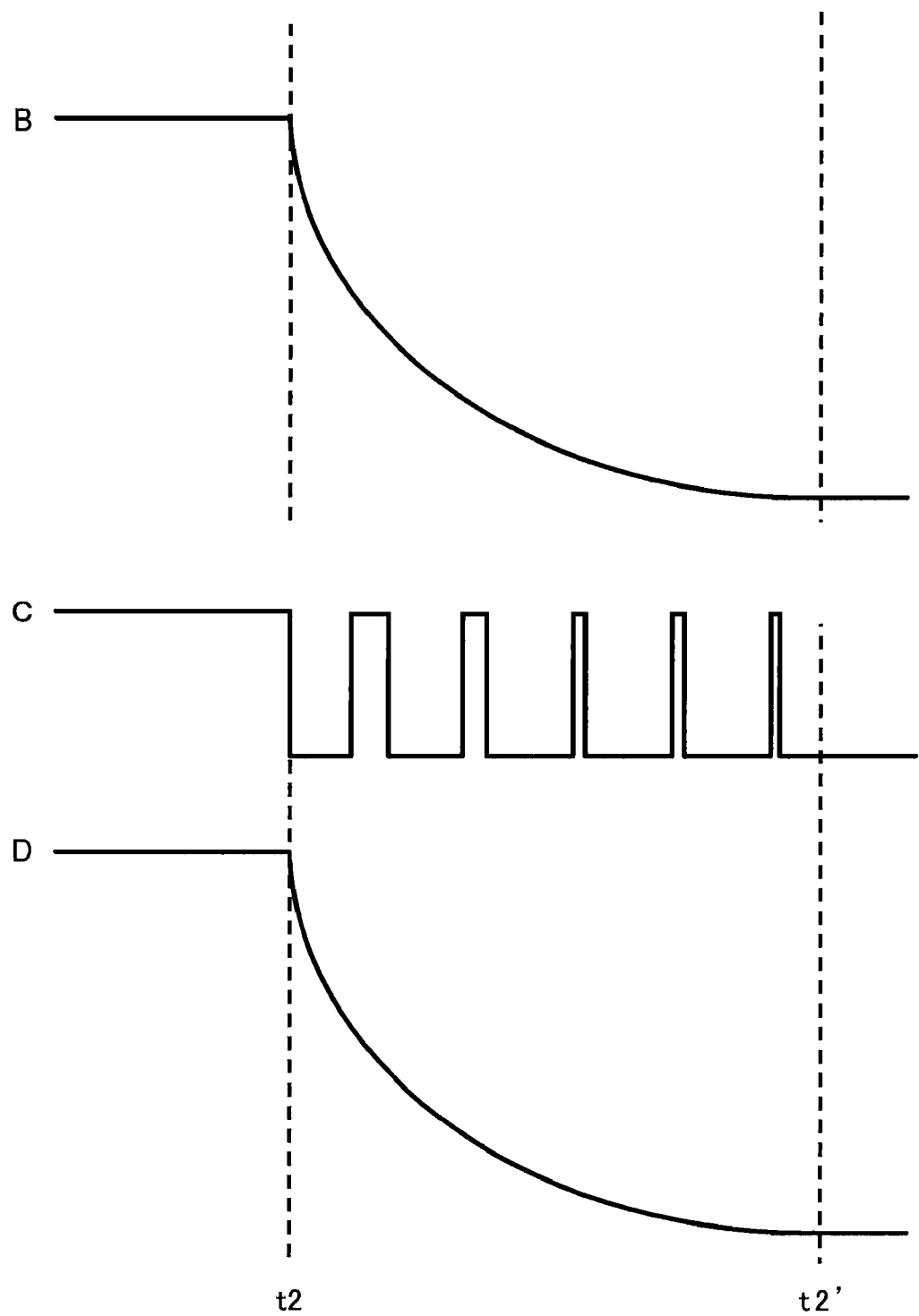
FIG. 4 is a partially enlarged waveform diagram of another part illustrating the operation of Example 1 in more detail.

FIG. 4 is similar to FIG. 3 and illustrates a detail of the state from turn-off fall timing t2 until the luminance decreases to the minimum value in one period of the blink when the LEDs 6 and 8 are controlled. Symbol B in FIG. 4 illustrates an enlarged part of the symbol B in FIG. 2 and indicates the luminance change of the LEDs 6 and 8 similarly to FIG. 2. Symbol C in FIG. 4 is a conceptual diagram of the output waveform of the pulse width modulating section 30 before and after the turn-off fall timing t2. The duty cycle is 100 percent before t2, and the duty cycle decreases to zero percent gradually from t2 to t2'. In addition, symbol D in FIG. 4 illustrates a temporal change of the light energy for turn-off stored in the lamp emission data storage section 28 similarly to the symbol D in FIG. 3. Similarly to FIG. 3, the change of the duty cycle (symbol C in FIG. 4) is carried on so that the luminance change of the LED (symbol B in FIG. 4) simulates the luminance change of the lamp (symbol D in FIG. 4). Qualitatively speaking, the duty cycle (symbol C in FIG. 4) decreases rapidly after t2 and then approaches zero percent mildly. Note that symbol C in FIG. 4 illustrates a concept of the change of the duty cycle and is not an actual waveform similarly to symbol C in FIG. 3.

Figure 5:
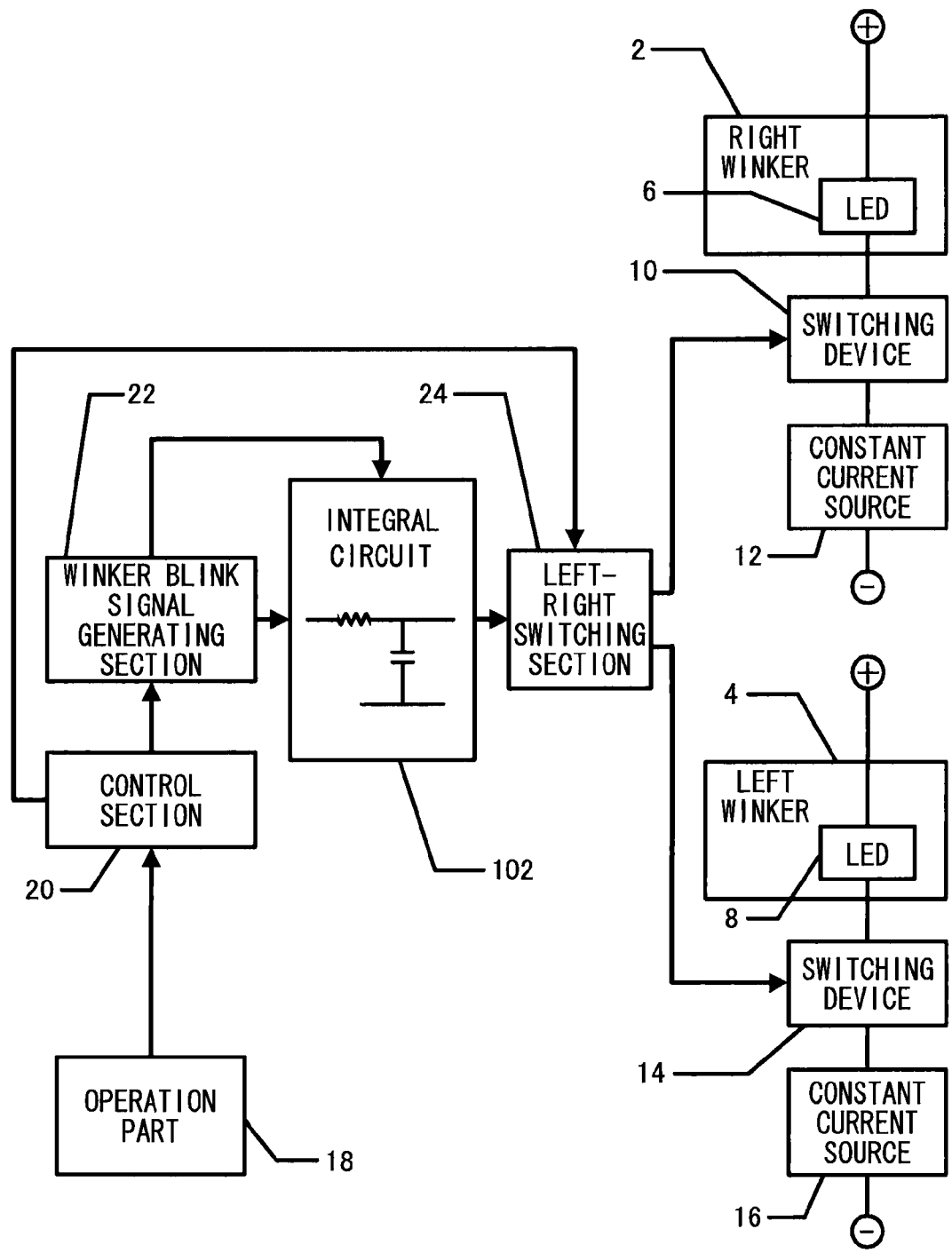
FIG. 5 is a block diagram illustrating Example 2 of the vehicle winker controller according to the embodiment of the present invention.

FIG. 5 is a block diagram illustrating Example 2 of the vehicle winker controller according to the embodiment of the present invention. The same section as Example 1 illustrated in FIG. 1 is denoted by the same numeral, and description thereof will be omitted. Example 2 illustrated in FIG. 5 is different from Example 1 illustrated in FIG. 1 in that the duty control section 26, the lamp emission data storage section 28 and the pulse width modulating section 30 in FIG. 1 are replaced with an integral circuit 102. In other words, the integral circuit 102 corresponds to the timing signal input section and the emission control signal generating section described above.

The integral circuit 102 converts the output of the winker blink control section 22 indicated by symbol A in FIG. 2 into the control signal simulating the lamp light energy variation indicated by symbol B in FIG. 2 in an approximate manner. The time constant of the integral circuit 102 is adjusted so that the output thereof approaches the waveform of symbol B in FIG. 2. In addition, in order to simulate the blink of the lamp without a different feeling, the integral circuit 102 is structured so that two types of time constants can be switched and can be set. Thus, the time constant is switched between the two types in accordance with whether the rising or the falling responding to the winker blink signal. In FIG. 5, the signal line from the upper side of the winker blink signal generating section 22 to the upper side of the integral circuit 102 transmits a signal for the switching.

Figure 6:
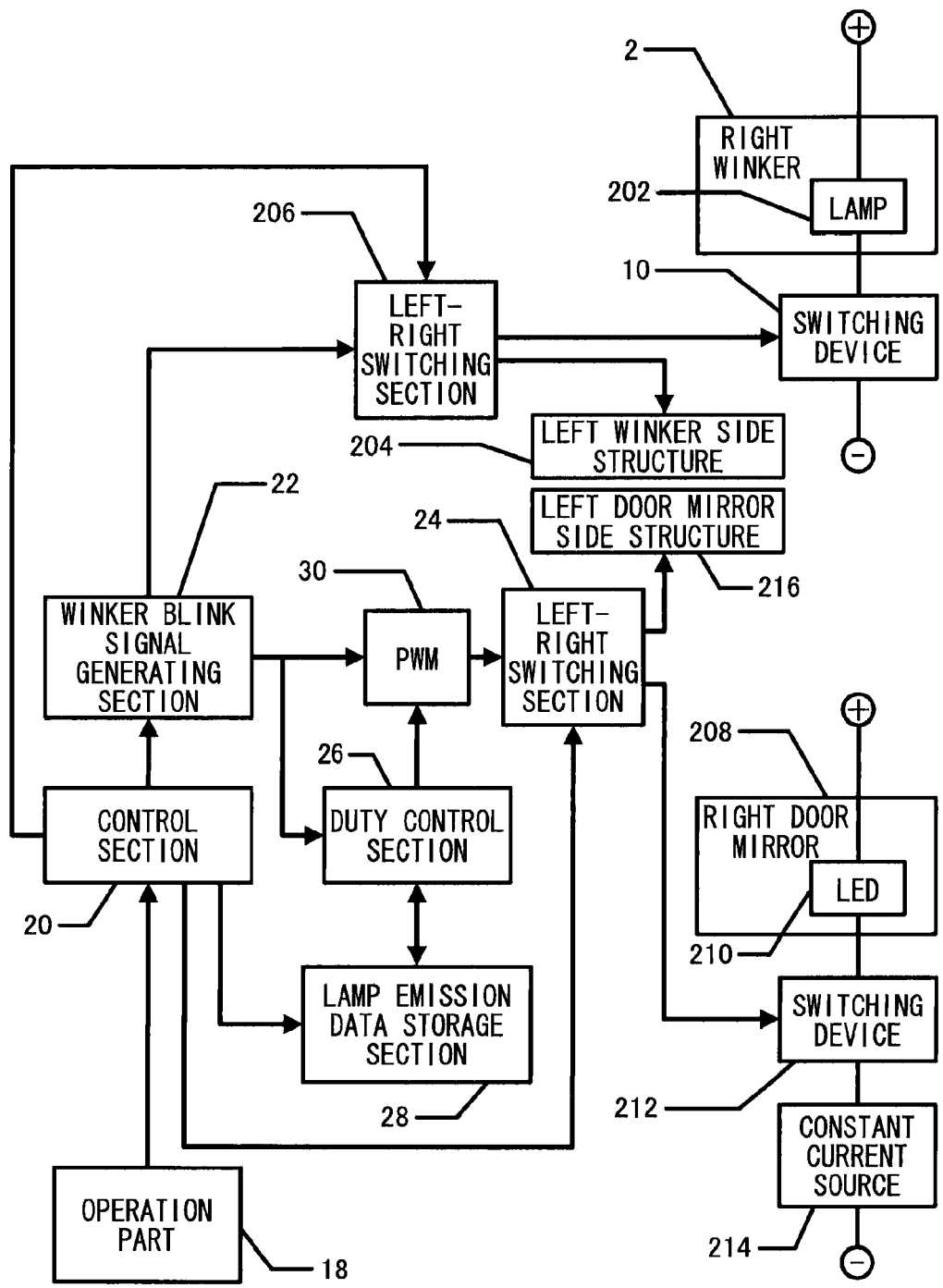
FIG. 6 is a block diagram illustrating Example 3 of the vehicle winker controller according to the embodiment of the present invention.

FIG. 6 is a block diagram illustrating Example 3 of the vehicle winker controller according to the embodiment of the present invention. The same section as Example 1 illustrated in FIG. 1 is denoted by the same numeral, and description thereof will be omitted. Example 3 illustrated in FIG. 6 is different from Example 1 illustrated in FIG. 1 in that the light source of the right winker 2 is different from a conventional bulb lamp 202. Note that the light source of the left winker is similarly the bulb lamp, but the structure thereof is the same as the right winker 2 side. Therefore, they are illustrated simply as a batch of a left winker side structure 204 in FIG. 6.

As described above, in Example 3 of FIG. 6, the light source of the left and right winkers are a lamp. Therefore, the winker blink signal generating section 22 is connected directly to the input of the switching device 10 via a left-right switching section 206. Note that the switched state of the left-right switching section 206 follows the operation of the operation part 18 and is the same as the switched state of a left-right operation part 24. For instance, if turning right operation is performed by the operation part 18, the switching is performed so that both the left-right switching section 24 and the left-right switching section 206 send a blink output signal to the right winker side structure (and the switching device 10). In other words, the left-right switching section 206 corresponds to the above-mentioned selection signal input section.

In Example 3 of FIG. 6, a right door mirror 208 is provided with an auxiliary winker light source constituted of a LED 210. A switching device 212 and a constant current source 214 for controlling the LED 210 are the same as the switching device 10 and the constant current source 12 illustrated in FIG. 1. In other words, the switching device 212 (as well as the switching device included in a left door mirror side structure 216) corresponds to one of the plurality of output sections for delivering the control signal of the emission control signal generating section. In Example 3 of FIG. 6, in order to control the switching device 212, a pulse width modulated signal is supplied from the left-right switching section 24. The duty control section 26, the lamp emission data storage section 28 and the pulse width modulating section 30 are the same as those of the structure illustrated in FIG. 1.

Note that an LED is used for a light source of the left door mirror similarly to the light source of the right door mirror 208, and the structure thereof is the same as the right door mirror side. Therefore, they are illustrated simply as a batch of a left door mirror side structure 216 in FIG. 6.

As described above, the auxiliary winker light source constituted of the LED 210 on the door mirror performs the blinking that simulates the bulb lamp though it is an LED similarly to the winker light source of Example 1. Therefore, the blinking manner of itself has no feeling difference, and it blinks in synchronization with the bulb lamp 202 of the winker.

Note that Example 3 of FIG. 6 illustrates the example where a bulb lamp and an LED are used in a mixed manner for the winker and the auxiliary winker, respectively. Without limiting to the usage of FIG. 6, the same structure can be used also in the case where an LED is used for the winker while a bulb lamp is used for the auxiliary winker. In addition, without limiting to the relationship between the winker and the auxiliary winker, the structure can be used also in the case where a bulb lamp is used for one of the front and the rear winters while an LED is used for the other winker.

Figure 7:
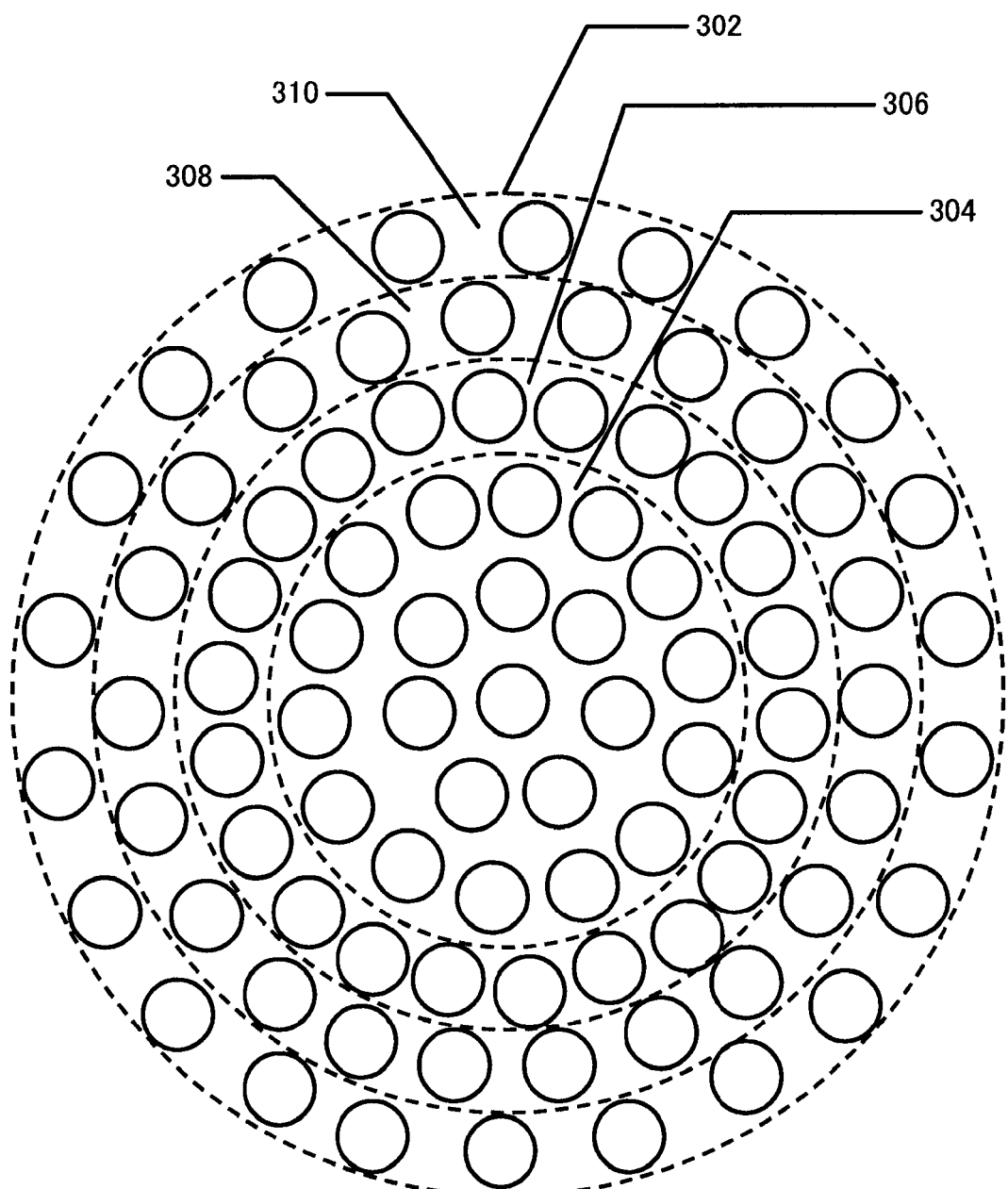
FIG. 7 is a front view illustrating an arrangement of a plurality of LED groups of a winker illustrating Example 4 of the vehicle winker controller according to the embodiment of the present invention.

FIG. 7 is a front view of a winker illustrating Example 4 of the vehicle winker controller according to the embodiment of the present invention and illustrates an arrangement of a plurality of LED groups. A plurality of LEDs 302 illustrated in FIG. 7 constitute a light source of one winker as a whole. The plurality of LEDs 302 are divided into four groups, which include, in the order from the center, a central zone LED group 304, a center middle zone LED group 306, an outer middle zone LED group 308 and an outer zone LED group 310.

Each of the LED groups is controlled to blink as a batch, and there are deviations of the turn-on timing and the turn-off timing among the groups. It will be described in detail. At the turn-on rise timing, the central zone LED group 304 is turned on first, and then the center middle zone LED group 306, the outer middle zone LED group 308 and the outer zone LED group 310 are turned on sequentially in this order, so that total luminance of the plurality of LEDs 302 simulates the temporal change of the light energy when the bulb lamp is turned on as illustrated in the symbol D in FIG. 3. In addition, at the turn-off fall timing, on the contrary to the turn-on rise timing, the outer zone LED group 310 is turned off first, and then the outer middle zone LED group 308, the center middle zone LED group 306 and the central zone LED group 304 are turned off sequentially in this order, so that total luminance of the plurality of LEDs 302 simulates the temporal change of the light energy when the bulb lamp is turned off as illustrated in the symbol D in FIG. 4.

Observing an apparent manner when the bulb lamp is turned on, luminance of the filament and the vicinity thereof in the center of the lamp increases and spreads to the periphery thereof so as to be a maximum luminance so that it looks as if a whole diffusing surface of the lamp is shining. On the other hand, when the bulb lamp is turned off, it looks like the shining region decreases and finally a remaining region around the filament disappears. The light control of the LED groups illustrated in FIG. 7 is performed for simulating such the apparent manner of blink of the bulb lamp.

Note that there are deviations of the blink timing among the plurality of LED groups in Example 4 illustrated in FIG. 7, so that the total luminance of the entire of the plurality of LEDs 302 simulates the light energy variation of the bulb lamp. Therefore, the structure of Example 4 simulates not only the apparent increase and decrease of the light source area of the blink of the bulb lamp but also the total luminance change of the entire in the blink of the bulb lamp. Therefore, the waveform of the control signal for each of the switching devices for the LEDs can be the rectangular wave as illustrated in FIG. 2 as the symbol A.

However, also in Example 4, adding to the above-described structure, it is possible to supply the control signal modulated by the duty control section 26, the lamp emission data storage section 28 and the pulse width modulating section 30 illustrated in FIG. 1 or with a waveform change by the integral circuit 102 illustrated in FIG. 5 to the switching device, so that each of the LEDs blinks with the luminance change illustrated in FIG. 2 as the symbol B. Thus, it is possible to simulate the blink of the bulb lamp more smoothly.

Figure 8:
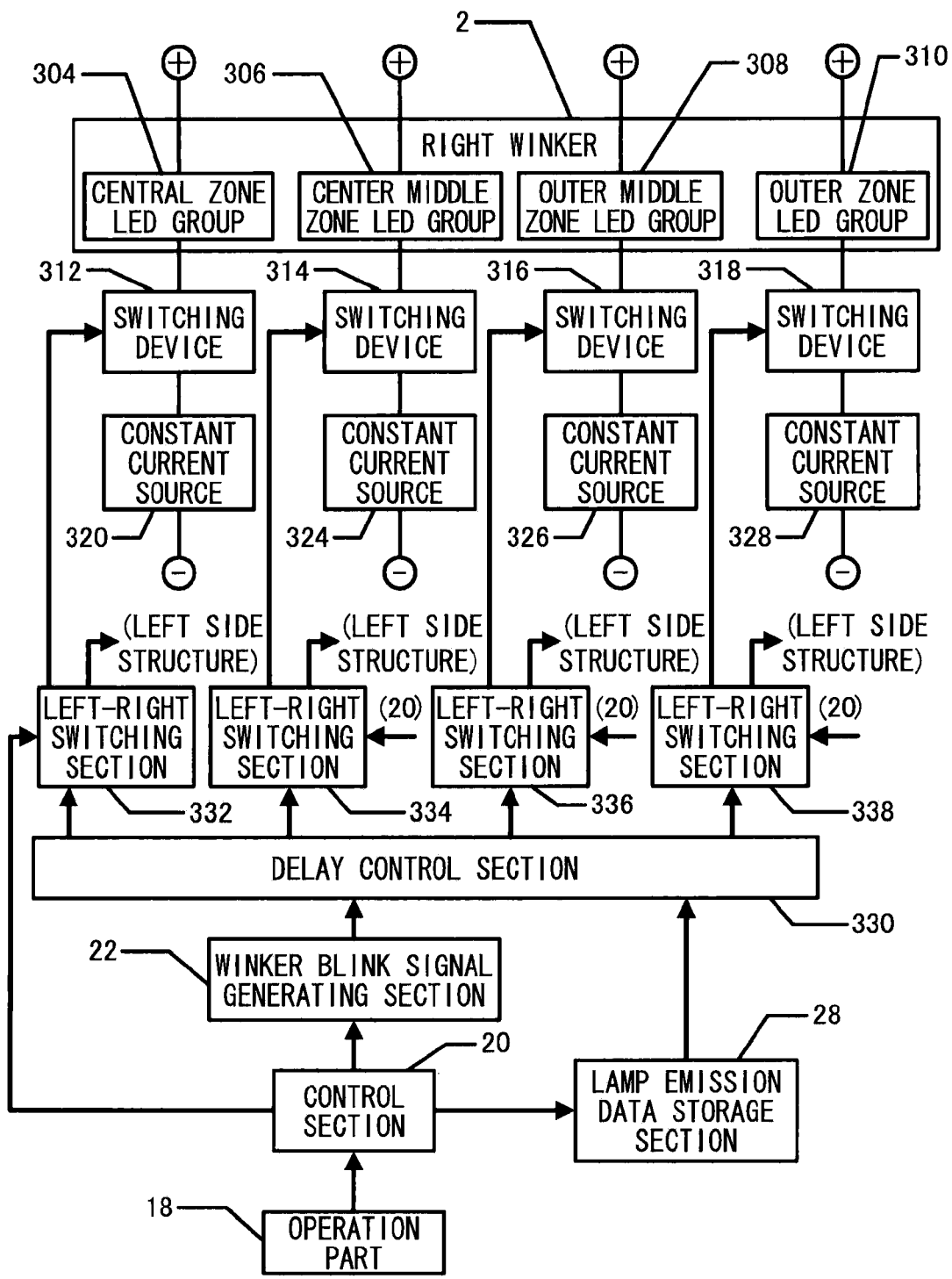
FIG. 8 is a block diagram illustrating a structure for controlling the LED groups in Example 4 of the present invention.

FIG. 8 is a block diagram illustrating a structure for controlling the LED groups in the above-described structure of Example 4 of the present invention. The right winker 2 is provided with LED groups including the central zone LED group 304, the center middle zone LED group 306, the outer middle zone LED group 308 and the outer zone LED group 310 as illustrated in FIG. 7. The switching devices 312, 314, 316 and 318 are the same as the switching device 10 illustrated in FIG. 1 and respectively control the blinks of the central zone LED group 304, the center middle zone LED group 306, the outer middle zone LED group 308 and the outer zone LED group 310 integrally. In other words, each of the switching devices 312, 314, 316 and 318 (and the switching device included in the left winker 4) corresponds to one of the plurality of output sections for delivering the control signal for the emission control signal generating section. In addition, each of constant current sources 320, 324, 326 and 328 is the same as the constant current source 12 illustrated in FIG. 1 and supplies current for lighting to the central zone LED group 304, the center middle zone LED group 306, the outer middle zone LED group 308 and the outer zone LED group 310.

The operation part 18, the control section 20, the winker blink signal generating section 22 are the same as those illustrated in FIG. 1, and the output of the winker blink signal generating section 22 is supplied to a delay control section 330. The delay control section 330 generates turn-on signals and turn-off signals having different timings for the switching devices 312, 314, 316 and 318 based on information from the lamp (incandescent lamp) data storage section 28. The delay control section 330 corresponds to the timing signal input section and the emission control signal generating section described above. Detail thereof will be described later.

The timing signals from the delay control section 330 are supplied to the switching devices 312, 314, 316 and 318 via left-right switching sections 332, 334, 336 and 338 which are switched by the control section 20. Note that each of the left-right switching sections 332, 334, 336 and 338 corresponds to the above-described selection signal input section.

In addition, each of the left-right switching sections 332, 334, 336 and 338 is also connected to the switching device for controlling the central zone LED group, the center middle zone LED group, the outer middle zone LED group and the outer zone LED group of the left winker. The left side structure is the same as the structure of the right winker side, so they are omitted in FIG. 8.

Figure 9:
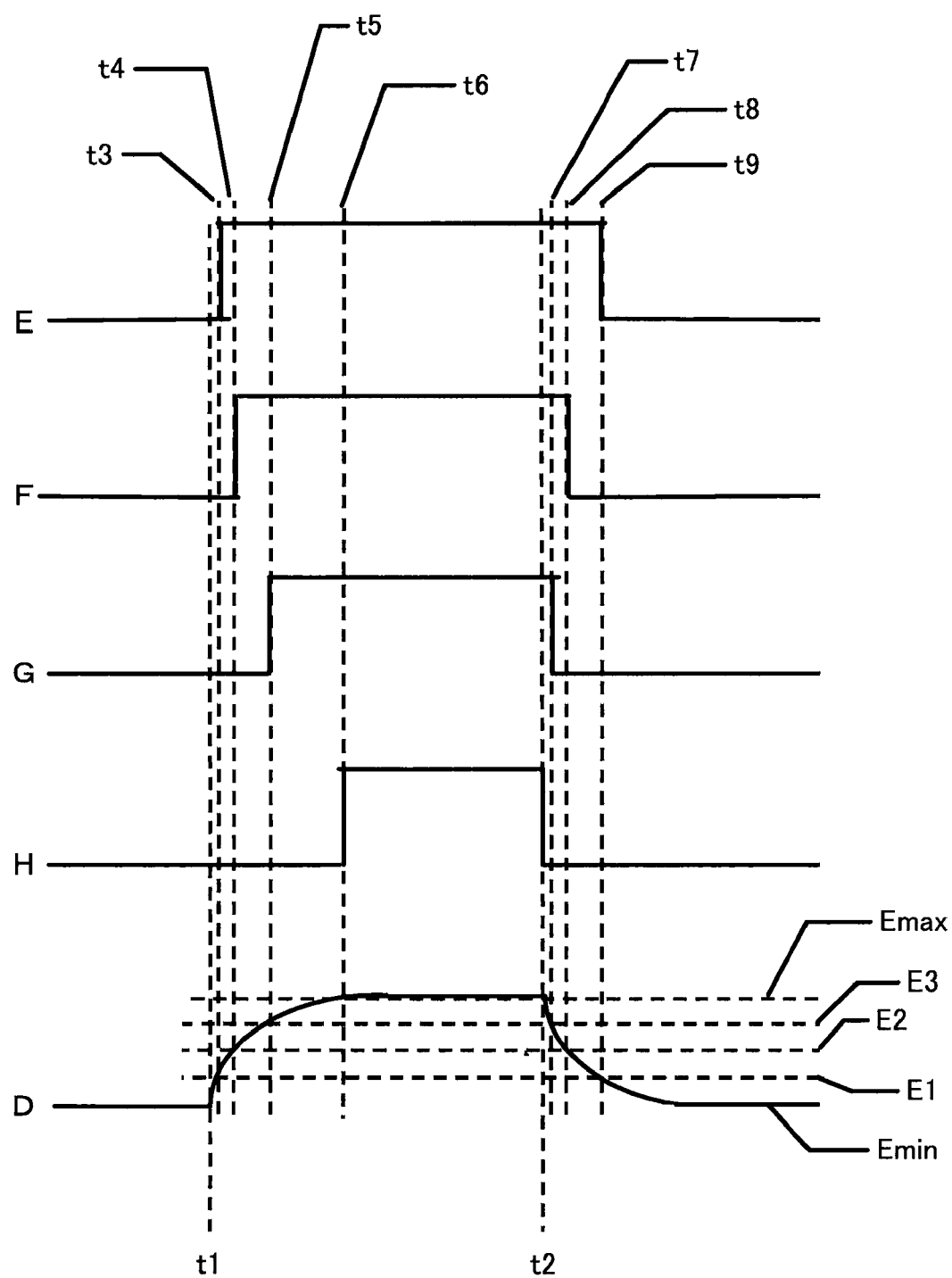
FIG. 9 is a waveform diagram illustrating output waveforms in Example 4.

FIG. 9 is a waveform diagram illustrating output waveforms of the delay control section 330 illustrated in FIG. 8, in which the horizontal axis represents lapse time. Symbol D in FIG. 9 is similar to the symbol D in FIG. 3 and the symbol D in FIG. 4 and illustrates a temporal change of the light energy of the bulb lamp stored in the lamp emission data storage section 28, in which the vertical axis represents energy. Similarly to the symbol D in FIG. 3 and the symbol D in FIG. 4, t1 denotes the rise timing of the blink while t2 denotes the fall timing of the blink.

The delay control section 330 illustrated in FIG. 8 delivers control signals having waveforms as indicated by symbol E in FIG. 9, symbol F, symbol G and symbol H to the switching devices 312, 314, 316 and 318, respectively, based on the temporal change of the light energy (symbol D in FIG. 9). Specifically, after the time point t1, at the time point t3 when the luminance as indicated by symbol D in FIG. 9 reaches E1, the control signal to the switching device 312 rises as indicated by symbol E in FIG. 9 so that the central zone LED group 304 is turned on. Next, at the time point t4 when the luminance as indicated by symbol D in FIG. 9 reaches E2, the control signal to the switching device 314 rises as indicated by symbol F in FIG. 9 so that the center middle zone LED group 306 is turned on. Thus, luminance of the entire right winker 2 becomes the sum of luminance values of the central zone LED group 304 that is already turned on and the center middle zone LED group 306 that is turned on this time. At the same time, the lighting area increases.

Hereinafter, in the same manner, at the time point t5 when the luminance as indicated by symbol D in FIG. 9 reaches E3, the control signal to the switching device 316 rises as indicated by symbol G in FIG. 9. At the time point t6 when the luminance as indicated by symbol D in FIG. 9 reaches Emax, the control signal to the switching device 318 rises as indicated by symbol H in FIG. 9. Thus, all the LEDs are turned on so that the total luminance becomes a maximum value and the area of the lighting region also becomes largest.

On the other hand, at the time point t2, as indicated by symbol H in FIG. 9, the control signal to the switching device 318 is first turned off, so that only the outer zone LED group 310 is turned off. Next, at the time point t7 when the luminance as indicated by symbol D in FIG. 9 is decreased to E3, the control signal to the switching device 316 is turned off as indicated by symbol G in FIG. 9. After that, in the same manner, at the time point t8 when the luminance as indicated by symbol D in FIG. 9 is decreased to E2, the control signal to the switching device 314 is turned off as indicated by symbol F in FIG. 9. Finally, at the time point t9 when the luminance as indicated by symbol D in FIG. 9 is decreased to E1, the control signal to the switching device 312 is turned off as indicated by symbol E in FIG. 9. Thus, the luminance of the entire right winker 2 is decreased simulating the luminance change of the bulb lamp as indicated by symbol D in FIG. 9, and the lighting area is also decreased.

The above-described Example 4 has the structure in which the LEDs are divided into the central zone LED group 304, the center middle zone LED group 306, the outer middle zone LED group 308 and the outer zone LED group 310 so that the number of LEDs in each group becomes the same, so that the total sum of the light energy when the groups are turned on or off sequentially changes at the same interval. Each of the LED groups is turned on or off at the timing when a predetermined difference occurs in the light energy variation of the bulb lamp to be simulated. However, the point of the present invention is in that the light energy variation of the entire LED light source simulates the light energy variation of the bulb lamp, so it is not limited to the above-described embodiment.

For instance, it is possible to adopt another structure in which the central zone LED group 304, the center middle zone LED group 306, the outer middle zone LED group 308 and the outer zone LED group 310 are turned on or off sequentially at the same time interval, and the number of each LED group is the number corresponding to the light energy variation of the bulb lamp at the same time interval.

Further, as an intermediate form of the above-described forms, as long as the structure secures that the light energy variation of the entire LED light source simulates the light energy variation of the bulb lamp as a result, it is possible to set different numbers of LEDs in the LED groups and to set different intervals of turn-on or off timing for the LED groups in accordance with convenience of control or convenience of LED arrangement.

Figure 10:
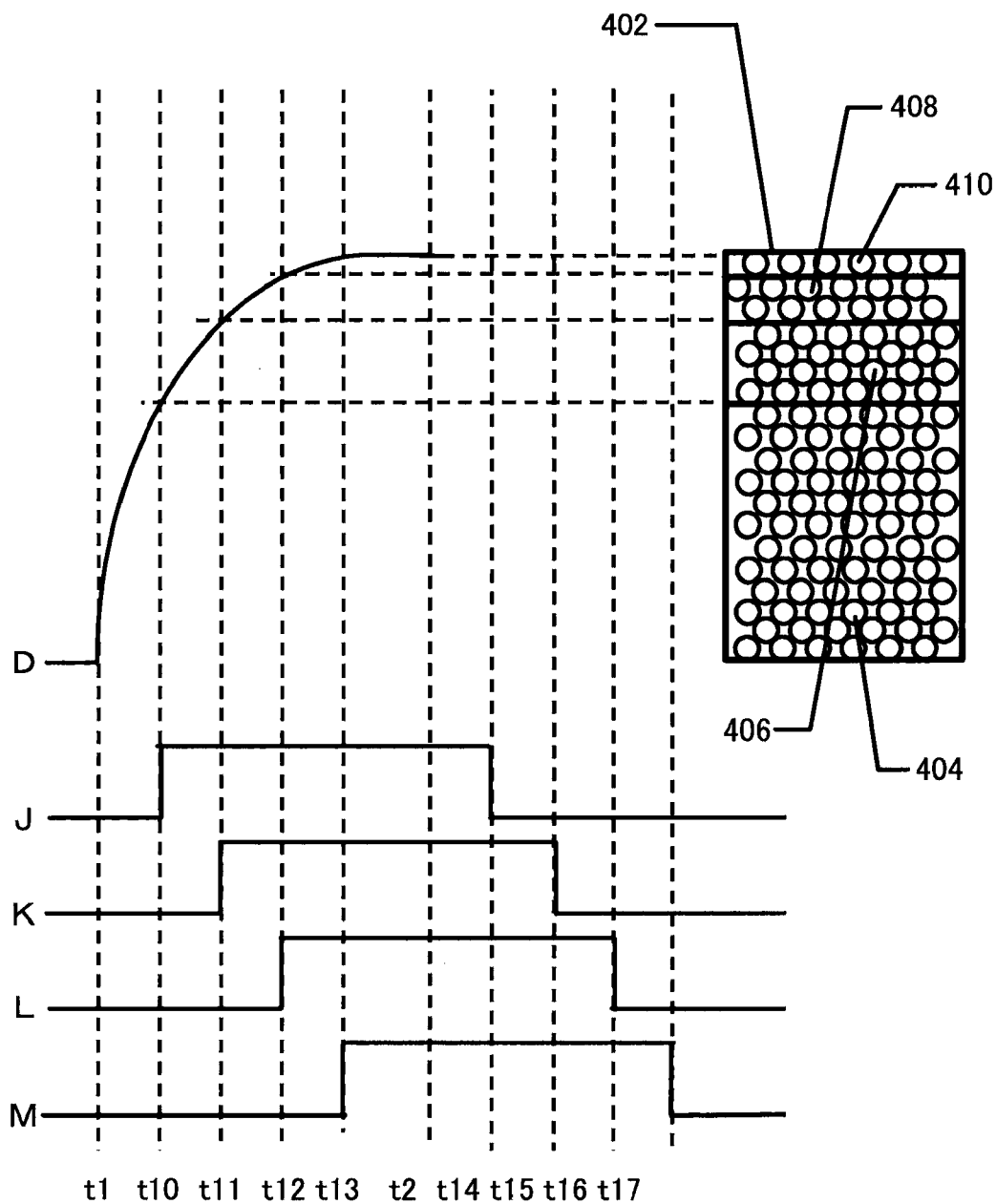
FIG. 10 illustrates a front view of the winker showing Example 5 of the vehicle winker controller according to the embodiment of the present invention, and a waveform diagram of the output waveform associated with the arrangement thereof.

FIG. 10 is a front view of a winker illustrating Example 5 of the vehicle winker controller according to the embodiment of the present invention and is a waveform diagram of output waveforms of the LED group associated with the arrangement. In Example 5, similarly to Example 4, the plurality of LEDs 402 constitute the light source of one winker as a whole. In addition, the plurality of LEDs 402 are divided into the first LED group 404, the second LED group 406, the third LED group 408 and the fourth LED group 410.

Symbol D in FIG. 10 is similar to symbol D in FIG. 9 and indicates the temporal change of the light energy of the bulb lamp emission in which the horizontal axis represents time while the vertical axis represents the energy. Similarly to FIG. 9 and the like, t1 denotes the rise timing of the blink, and t2 denotes the fall timing of the blink. Note that the period between t13 and t2 is shortened in FIG. 10 for convenience of illustration, but symbol D in FIG. 10 is substantially the same as symbol D in FIG. 9.

Example 5 is basically the same as Example 4 but is different concerning an arrangement of the first LED group 404, the second LED group 406, the third LED group 408 and the fourth LED group 410, and the turn-on timing and the turn-off timing thereof. In addition, the plurality of LEDs 402 constitutes a light source for the right winker, which is illustrated in a rotated manner by 90 degrees so as to indicate correspondence to the waveform diagram of symbol D in FIG. 10. The lower part of the plurality of LEDs 402 in FIG. 10 corresponds to the right end of the winker, and the upper part of the same corresponds to the left end of the winker. In other words, the first LED group 404 is disposed at the innermost side of the vehicle, and the fourth LED group 410 is disposed at the outermost side of the vehicle.

In addition, the number of the LEDs in each LED group is set so as to correspond to the light energy variation of the bulb lamp at the same time interval. As described below, time differences of the turn-on timings t1, t10, t11, t12 and t13, as well as time differences of the turn-off timings t2, t14, t15, t16 and t17 are the same interval.

It will be described in detail. At t10, a predetermined time after t1, the first LED group 404 having the number of LEDs corresponding to the light energy of the bulb lamp at this time point is turned on as indicated by symbol J in FIG. 10. Next, at t11, the second LED group 406 having the number of LEDs corresponding to the increase of light energy of the bulb lamp after t10 is turned on as indicated by symbol K in FIG. 10. After that, in the same manner, the third LED group 408 is turned on as indicated by symbol L in FIG. 10 at t12, and the fourth LED group is turned on as indicated by symbol M in FIG. 10 at t13, so that the total energy thereof reaches the maximum value.

On the other hand, in the turn-off process, the first LED group 404 is turned off at t14, a predetermined time after t2 as indicated by symbol J in FIG. 10. Thus, the light energy corresponding to the light energy difference between the time point t1 and the time point t2 is decreased and disappears. Next at t15, the second LED group 406 is turned off as indicated by symbol K in FIG. 10. After that, in the same manner, the third LED group 408 is turned off at t16 as indicated by symbol L in FIG. 10, and the fourth LED group is turned off at t17 s indicated by symbol M in FIG. 10, so that all the LEDs are turned off.

As described above, the plurality of LEDs 402 blink with the light energy variation in such a manner to simulate the temporal change of the light energy of the actual bulb lamp as a whole as indicated by symbol D in FIG. 10.

Note that the first LED group 404 that is turned on or off first among the plurality of LEDs 402 is disposed at the inner position of the vehicle in Example 5. Therefore, it is convenient for the entire light energy variation to simulate the light energy variation of the bulb lamp and for indicating an image of the direction of turning right or left because the turn on or off of the light emission is performed with time differences in such a manner to run outward.

However, the present invention is not limited to this structure, in which the plurality of LEDs 402 of Example 5 are divided into the first LED group 404, the second LED group 406, the third LED group 408 and the fourth LED group 410 and the LEDs are arranged as illustrated in FIG. 10. It is possible to mix the LEDs of the individual groups at random. In this case, it is possible to control the plurality of LEDs 402 to blink in such a manner to simulate the luminance change as indicated by symbol D in FIG. 10 as an average of the entire, which is suitable for the case where the action of the apparent running light in the left or the right direction in the blink should be eliminated.

Note that the light energy variation of the entire LED light source should simulate the light energy variation of the bulb lamp also in Example 5. Therefore, it is not necessary to limit to the structure illustrated in FIG. 10 in which the time differences of the blink timing are set to the same interval, and the difference of the number of the LEDs included in the individual LED groups simulates the luminance change as indicated by symbol D in FIG. 10. For instance, it is possible to adopt another structure illustrated in Example 4, in which the number of the LEDs included in the individual LED groups is set to the same, and the time difference of the blinking timing of the LED groups simulates the light energy variation of the bulb lamp. Further, as an intermediate form of the above-described forms, as long as the structure secures that the light energy variation of the entire LED light source simulates the light energy variation of the bulb lamp as a result, it is possible to set different numbers of LEDs in the LED groups and to set different intervals of turn-on or off timing for the LED groups.

Figure 11:
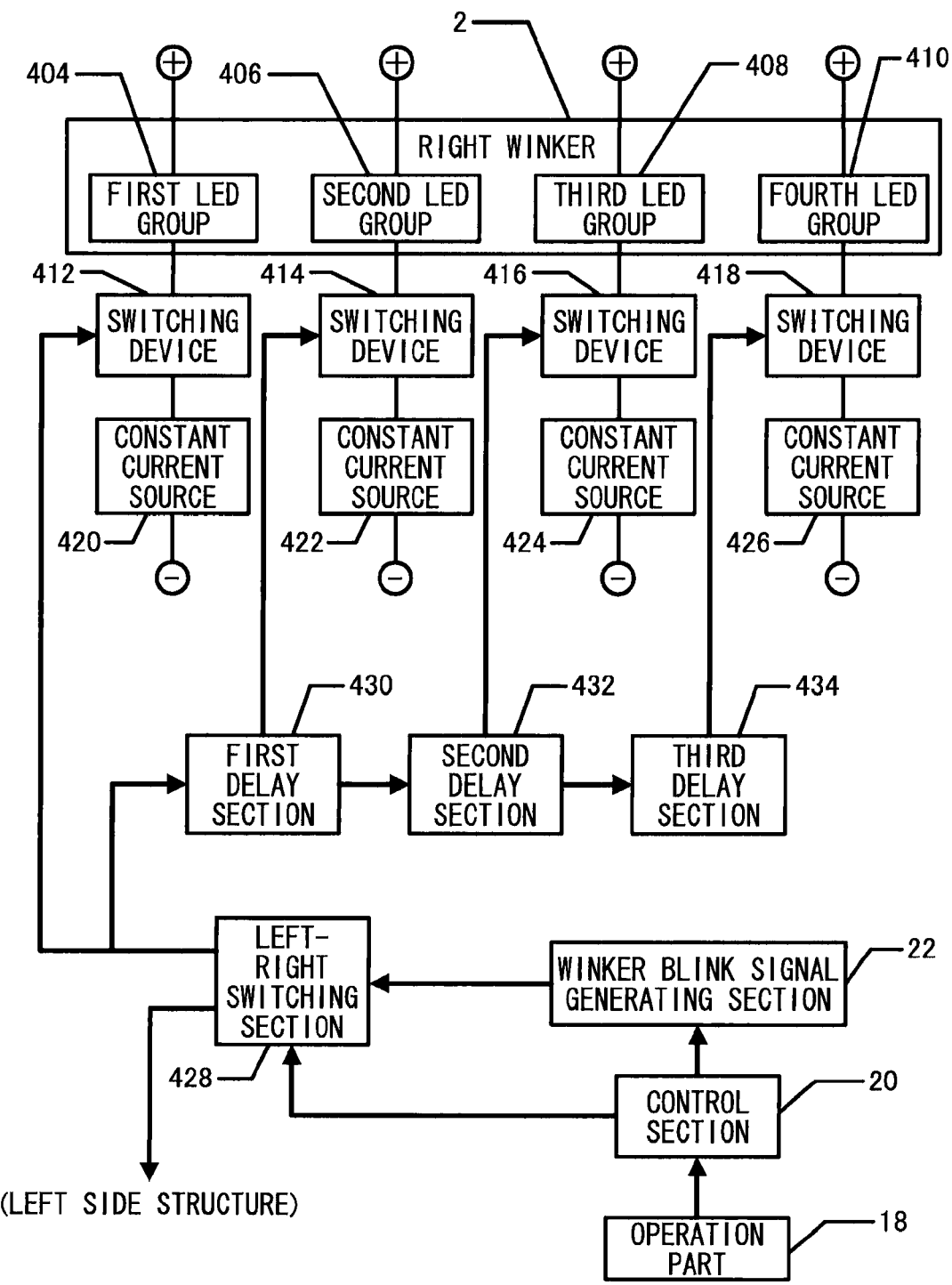
FIG. 11 is a block diagram illustrating a structure for controlling the LED groups in Example 5 of the present invention.

FIG. 11 is a block diagram illustrating the above-described structure for controlling the LED groups in Example 5 of the present invention. The right winker 2 is provided with the plurality of LEDs including the first LED group 404, the second LED group 406, the third LED group 408 and the fourth LED group 410 as illustrated in FIG. 10. Switching devices 412, 414, 416 and 418 are the same as the switching device 10 illustrated in FIG. 1 and controls the blinks of the first LED group 404, the second LED group 406, the third LED group 408 and the fourth LED group 410 integrally. In other words, each of the switching devices 412, 414, 416 and 418 (and the switching device included in the left winker 4) corresponds to one of the plurality of output sections for delivering the control signal for the emission control signal generating section. In addition, constant current sources 420, 422, 424 and 426 are the same as the constant current source 12 illustrated in FIG. 1 and respectively supply current for turning on the first LED group 404, the second LED group 406, the third LED group 408 and the fourth LED group 410.

The operation part 18, the control section 20 and the winker blink signal generating section 22 are the same as those illustrated in FIG. 1, but the output of the winker blink signal generating section 22 is connected to a left-right switching section 428. Note that the left-right switching section 428 corresponds to the timing signal input section and the selection signal input section described above. The output of the left-right switching section 428 is directly connected to the switching device 412, so as to control the first LED group 404 by the waveform as indicated by symbol J in FIG. 10. On the other hand, the output of the left-right switching section 428 is supplied also to a first delay section 430, and the output of the first delay section 430 is connected to the switching device 414 so as to control the second LED group 406 by the waveform as indicated by symbol K in FIG. 10. The output of the first delay section 430 is supplied also to a second delay section 432, and the output of the second delay section 432 is connected to the switching device 416 so as to control the third LED group 408 by the waveform as indicated by symbol L in FIG. 10. Further, the output of the second delay section 432 is supplied also to a third delay section 434, and the output of the third delay section 434 is connected to the switching device 418 so as to control the fourth LED group 410 by the waveform as indicated by symbol M in FIG. 10. In other words, each of the first delay section 430, the second delay section 432 and the third delay section 434 corresponds to the emission control signal generating section described above.

The left-right switching section 428 is connected to the switching device for controlling the first LED group for the left winker and the first delay section for the left winker. These left side structure is similar to the structure of the right winker side, so they are omitted in FIG. 11.

When various features of the above-described examples are embodied, features of the plurality of examples may be used appropriately without limiting to the case where each of them is embodied solely.

In addition, the present invention described above exemplifies the application to the winker of a vehicle, but the present invention is not limited to this application. For instance, the merit of the present invention can be obtained in the case where the LEDs are used for a brake lamp of a vehicle. Further, without limiting to a vehicle, the present invention can be applied to the case where the LEDs are used for a light source of a traffic signal.

In addition, without limiting to an application related to a traffic such as a vehicle or a traffic signal, the present invention can be used widely for relieving unpleasantness or irritation given to a person who sees the stimulative blink when certain information is transmitted by using LEDs as a light source.

Figure 12:
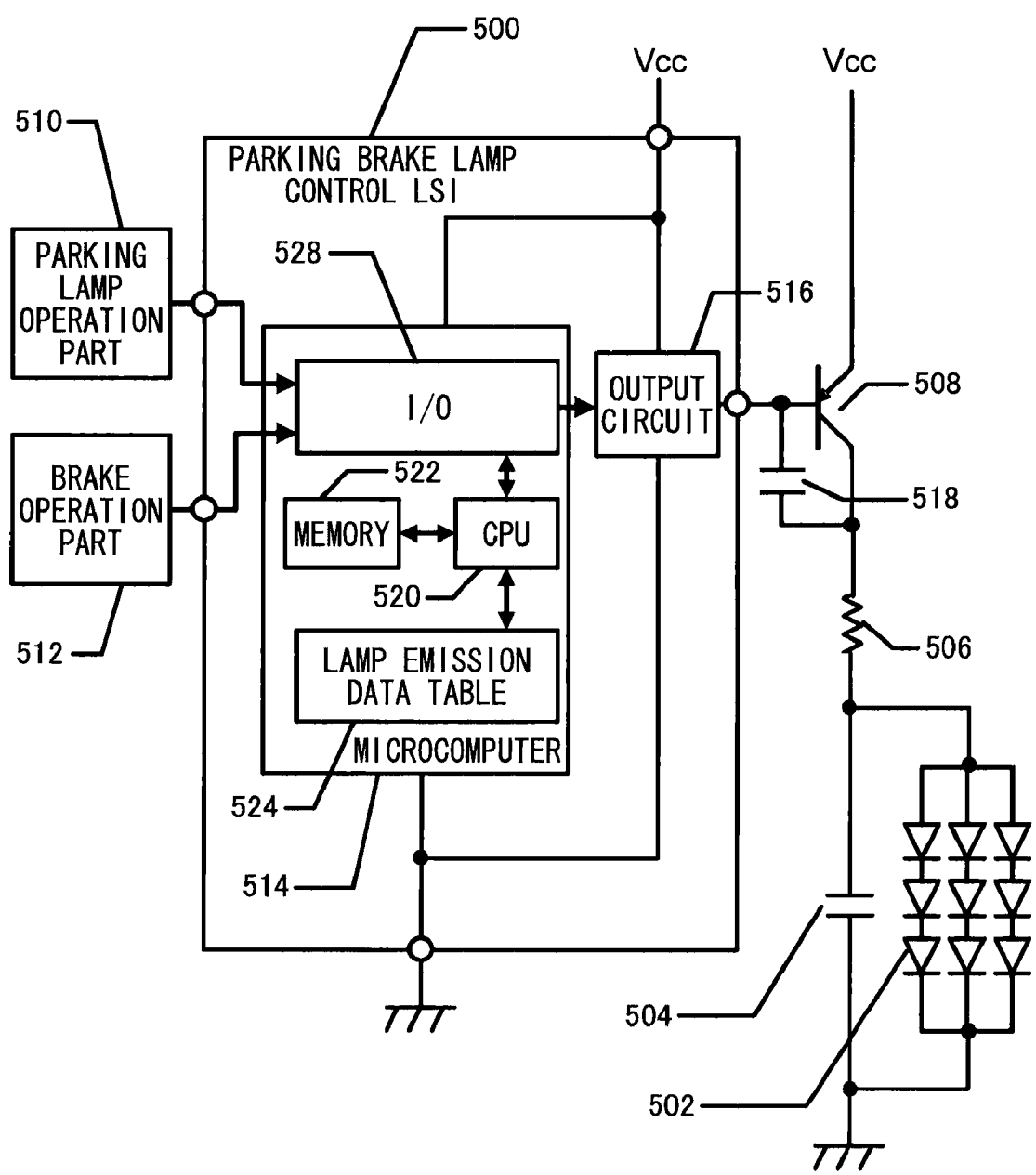
FIG. 12 is a block diagram of Example 6 according to the embodiment of the present invention, and illustrates an application to a parking brake lamp controller.

FIG. 12 is a block diagram of Example 6 according to the embodiment of the present invention. Although Examples 1 to 5 are structured as the winker controller, Example 6 illustrated in FIG. 12 is structured as a controller for controlling a parking brake lamp of a vehicle, which is controlled by a parking brake lamp control LSI 500.

In Example 6, a parking brake lamp 502 constituted of nine LEDs is connected in parallel to a voltage stabilizing capacitor 504. A switching transistor 508 is connected in series to the parallel connection via a current limiting resistor 506, so as to control the parking brake lamp 502. Note that the switching transistor 508 corresponds to the timing signal input section and the emission control section. With such the circuit structure, constant voltage control type PWM control is performed in Example 6. In contrast, constant current control type control is performed in the PWM control of in Examples 1 to 5.

The parking brake lamp 502 is turned on with a duty cycle of 7% by PWM control of the switching transistor 508 when the operation for turning on the parking lamp is performed with a parking lamp operation part 510. In contrast, when a brake operation part 512 is pedaled down, the switching transistor 508 is turned on with a duty cycle of 100% so as to turn on the parking brake lamp 502.

Such the control is performed by a microcomputer 514 (control section) of the parking brake lamp control LSI 500. The microcomputer 514 delivers the pulse that is PWM-controlled in accordance with an input of the operation signal from the parking lamp operation part 510 or the brake operation part 512 to an output circuit 516, so that the output circuit 516 controls ON and OFF of the switching transistor 508. Note that the microcomputer 514 and the output circuit 516 correspond to the PWM signal generating section.

At the moment when the switching transistor 508 is turned on, rush current may flow due to the voltage stabilizing capacitor 504 so that the switching transistor 508 may be broken down. In order to prevent this, there is a capacitor 518 connected between the base and the collector of the switching transistor 508. Thus, it is possible to prevent rush current from flowing in the switching transistor 508 at the rise timing of the pulse in the PWM control.

The operation of the microcomputer 514 is performed by a CPU 520, and there is provided a memory 522 for storing a processing program for the operation and data necessary for the process. In addition, the microcomputer 514 stores a lamp emission data table 524, and the CPU 520 refers to the lamp emission data table 524 for changing the duty cycle as time passes, so that the parking brake lamp 502 blinks simulating the bulb lamp. Note that the lamp emission data table 524 corresponds to the storage section. An input/output section 528 of the microcomputer 514 works as an input section for the operation signal from the parking lamp operation part 510 or the brake operation part 512 and works as an output section for the pulse supplied to the output circuit 516.

Figure 13:
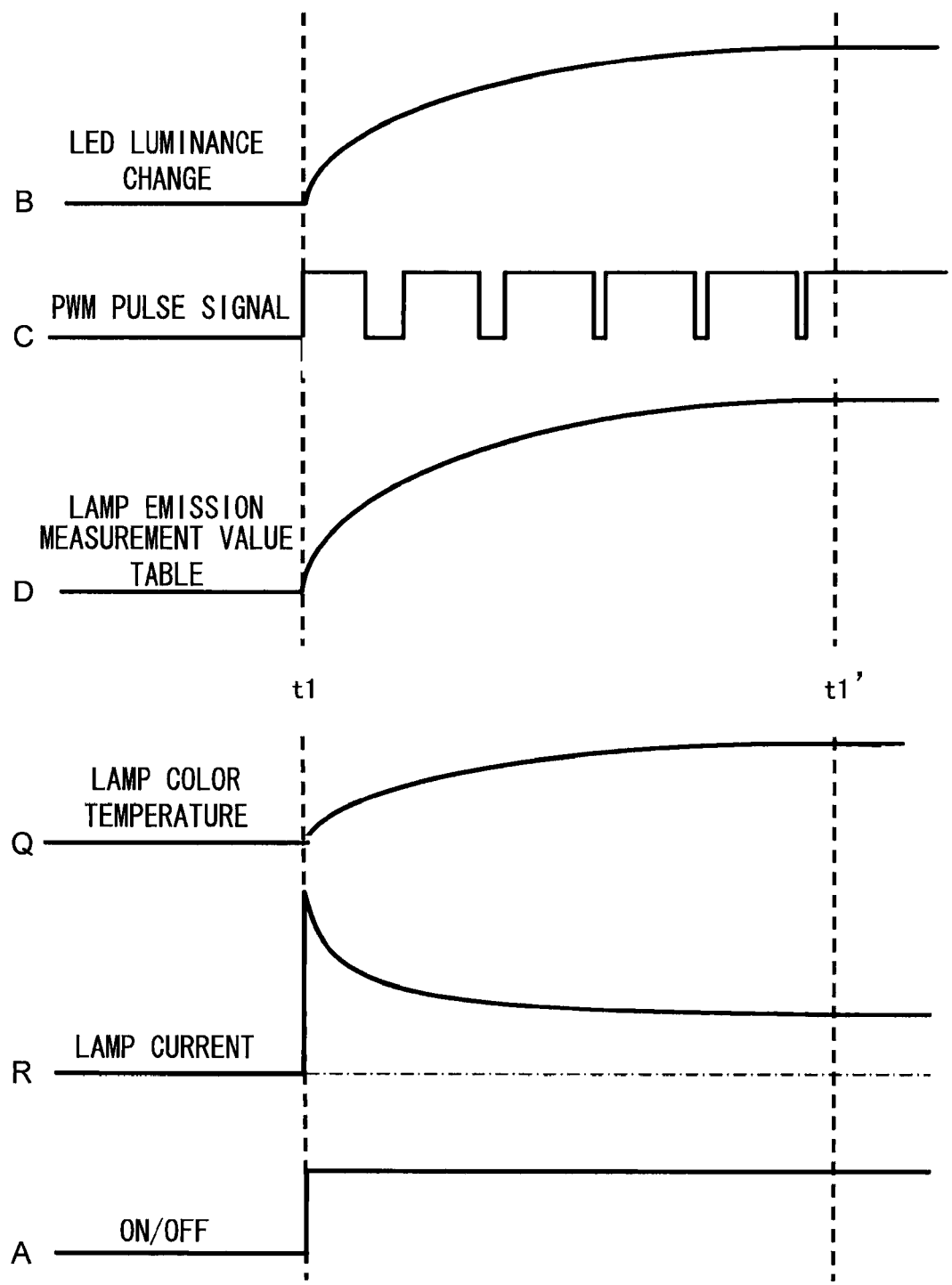
FIG. 13 is a waveform diagram illustrating a relationship between waveforms of the LED control at the rise of emission and the light emission characteristic of a bulb lamp in Example 6.

Symbol B, C and D in FIG. 13 illustrates waveforms similar to symbol B, C and D in FIG. 3, which indicate the state where luminance rises to the maximum value at t1' from the turn-on rise timing t1 when the parking brake lamp 502 is controlled. In addition, symbol A in FIG. 13 is similar to symbol A in FIG. 2 and indicates operation timing of the parking lamp operation part 510 or the brake operation part 512. At the timing t1, the signal for turning on the parking brake lamp 502 is generated. The bulb emission data table 524 (actual measurement value table) illustrated in FIG. 12 stores the data as indicated by symbol D in FIG. 13, and the CPU 520 refers to it for performing the PWM control. As indicated by symbol C in FIG. 13, the CPU 520 delivers the pulse having a duty cycle varying as time passes to the output circuit 516. Further, similarly to symbol C in FIG. 3, symbol C in FIG. 13 illustrates a concept of the change of the duty cycle, but a period of the waveform at an actual frequency (e.g., a few kilohertz) is too small to illustrate.

Symbol B in FIG. 13 illustrates luminance change of the parking brake lamp 502 when the switching transistor 508 is turned on and off by the PWM control, which simulates the light emission of the bulb lamp.

In order to make the LED change its luminance simulating the light emission of the bulb lamp by the PWM control, there are some points to be considered. First, when luminance of the LED is increased by changing the duty cycle in the PWM control, the light emission spectrum and the color temperature thereof are not changed basically. In contrast, in the case of the light emission of the bulb lamp, the spectrum of the color temperature varies from the infrared region to the incandescent state long with an increase of the filament temperature. Symbol Q in FIG. 13 illustrates the image thereof.

On the other hand, human luminosity varies depending on the wavelength, and the LED and the bulb lamp have largely different light emission spectrums. Therefore, human eyes sense different brightness between them for the same radiation energy even in a steady light emission state. Further, in order to make the LED emit light so as to simulate the rise of emission of the bulb lamp, it is necessary to perform the duty cycle control with sufficient consideration of the above-described problem of change of color temperature and luminosity for human eyes in the rise of the bulb lamp.

Secondly, impedance of the LED is basically not changed when the duty cycle is changed by the PWM control so as to change the luminance of the LED, while impedance of the filament of the bulb lamp is largely changed along with an increase of temperature in the rise of the light emission. The impedance in the incandescent state becomes approximately ten times the impedance at room temperature. Therefore, rush current occurs in the early stage of the turn-on rise in the bulb lamp, and the filament is rapidly heated in the early stage of the rise compared with the case where constant current flows for heating. Symbol R in FIG. 13 illustrates the image of the above-described rush current in the bulb lamp. Such the rush current affects also the luminance change in the rise of the lamp. Therefore, it is necessary to take this rush current into account for performing the duty cycle control of the LED that does not have such the phenomenon so as to emit light simulating the rise of emission of the bulb lamp.

Figure 14:
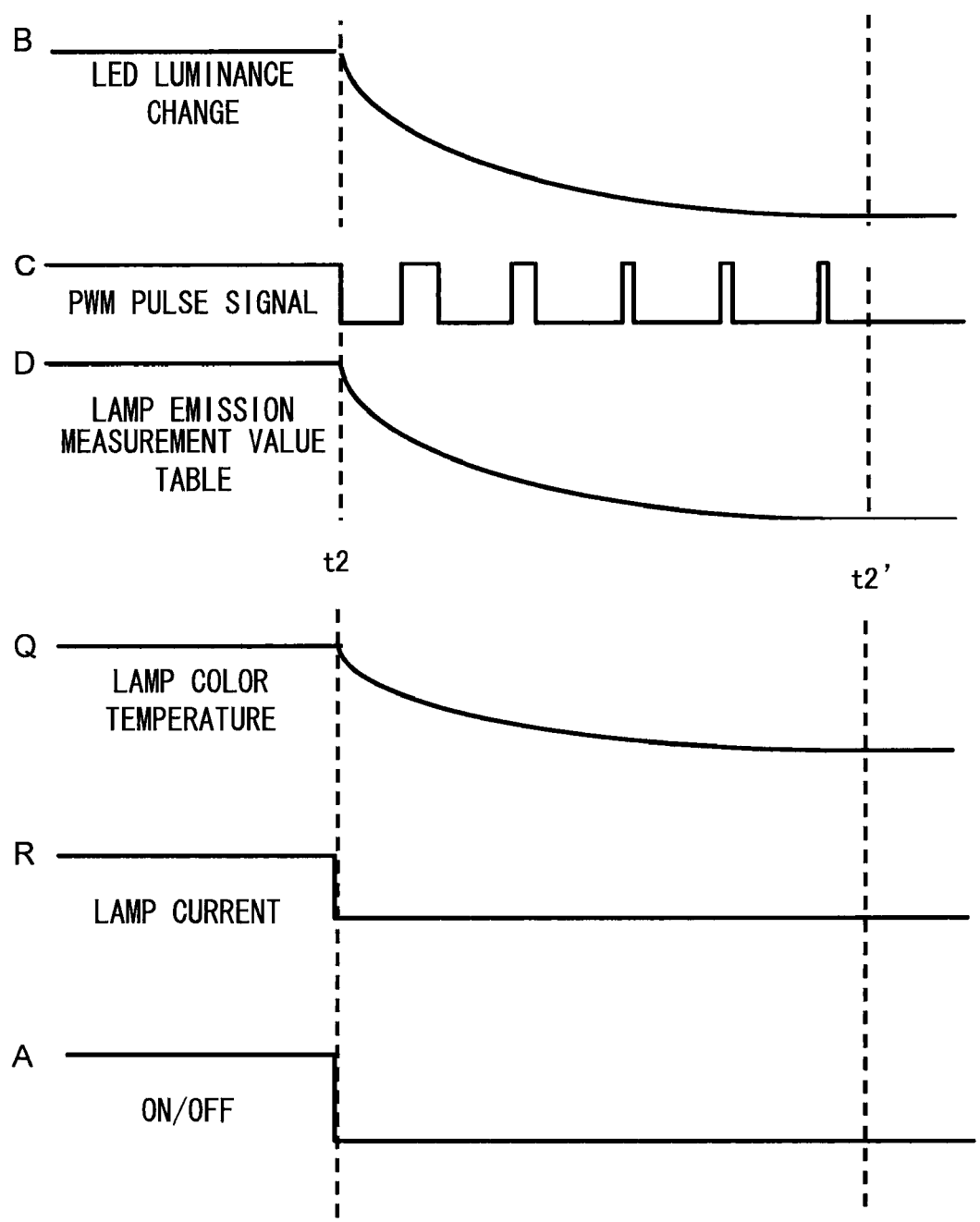
FIG. 14 is a waveform diagram illustrating a relationship between waveforms of the LED control at the fall of emission and the light emission characteristic of the bulb lamp in Example 6.

FIG. 14 illustrates waveforms similar to FIG. 13, and it illustrates the state from the fall timing t2 when the parking brake lamp 502 is turned off to the t2' when the luminance is completely turned off. In the fall of the light emission, as indicated by symbol R in FIG. 14, current flowing in the bulb lamp disappears by the OFF signal so that cooling of the filament becomes a simple natural heat radiation. Therefore, input energy variation does not affect the luminance change unlike the case of filament heating as indicated by symbol R in FIG. 13. In this way, energy input of filament heating in the light emission rise and the energy extinction in cooling the filament in the fall of emission have different conditions. Therefore, if the temporal change ratio of the duty cycle in the rise is simply the opposite of that in the fall with contraction or expansion, the control cannot simulate the blink of the bulb lamp.

On the other hand, as indicated by symbol Q in FIG. 14, color temperature of the lamp varies as the filament is cooled. Therefore, it is necessary to perform the duty cycle control considering the problem of change of color temperature and luminosity for human eyes in the fall of the bulb lamp similarly to the rise of emission illustrated in FIG. 13.

There is the above-described problem for simulating the blink of the bulb lamp by the PWM control of LEDs. However, since human eyes is accustomed to seeing a natural blink of the bulb lamp, approximation in a little may cause unnatural feeling on the contrary. For instance, it is considered to combine a counter and a logic circuit so as to generate a series of regular duty change as follows for the control.

For instance, the duty cycle in the rise is changed as a series of 0/8, 2/9, 4/10, 6/11, 8/12, 10/13, 12/14, 14/15 and 16/16, and the period of the change is also increased regularly from 8 to 16 that are denominators of the series. On the other hand, the duty cycle in the fall is changed as a series of 8/8, 7/9, 6/10, 5/11, 4/12, 3/13, 2/14, 1/15 and 0/16, and the period of the change is also increased regularly from 8 to 16 that are denominators of the series. However, it is not easy to cheat human eyes to feel comfortable by the regular luminance change in which the change in the rise and the change in the fall can be superposed on each other.

Figure 15:
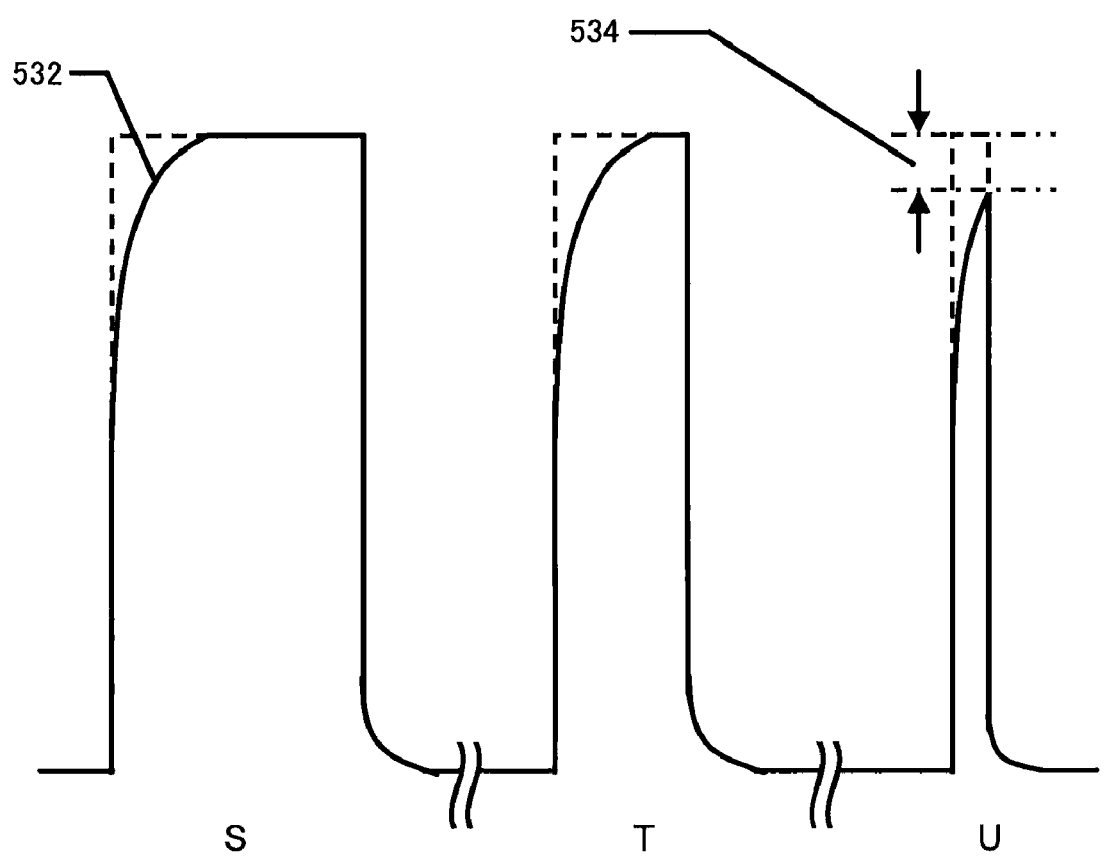
FIG. 15 is an enlarged waveform diagram of a PWM pulse signal denoted by symbol C in FIG. 14.

There is another problem if constant voltage drive type PWM control as illustrated in FIG. 12 is used for changing luminance of the LED so as to simulate the blink of the bulb lamp. FIG. 15 is an enlarged view of the PWM pulse signal as indicated by symbol C in FIG. 14, and the rise portion of the PWM control pulse that is supplied to the LED of the parking brake lamp 502 has a rounded portion 532. This is caused by influence of the capacitor 518 that is connected between the base and the collector of the switching transistor 508 for preventing a breakdown due to the rush current.

This rounded portion 532 causes no problem if the duty cycle is sufficiently large like a pulse portion S or a pulse portion T. However, if the duty cycle becomes small like a pulse portion U, the fall may start before the rounded portion rises to the maximum value. Consequently, the height of the pulse is decreased so that a voltage difference 534 occurs.

If the voltage difference 534 occurs, the area of the pulse corresponding to the input energy becomes smaller than a theoretical value determined by the duty cycle. As a result, the decreasing speed of the luminance is increased if the theoretical value is used for the control. Further, the decrease of the pulse height causes a decrease of a drive voltage for the LED, so that a variation of a current-luminance characteristic of the LED may appear.

When the constant voltage drive type PWM control is used for changing the luminance of the LED so as to simulate the blink of the bulb lamp, such the problem should also be considered. Specifically, it is necessary to correct the temporal change of the duty cycle to be smaller than the theoretical value at the tail portion of the fall so as to prevent the luminance change from being decreased excessively.

In view of above-described situation, the data to be stored in the lamp emission data table 524 is determined considering the following characteristics (1) to (5). As a result of integrating these characteristics (1) to (5), the table date becomes different from a regular series. In addition, the temporal change ratio of the duty cycle in the rise is not the simple opposite of that in the fall with contraction or expansion but different from that. In other words, they have the relationship in which the rise waveform and the fall waveform cannot be superposed on each other even by reversing and/or similarity deformation such as contraction or expansion.

(1) In the natural rise of the bulb lamp emission, the filament is rapidly heated because of the rush current compared with the case of heating by constant current.

(2) Comparing the bulb lamp just after the rise of emission with that just after the fall of emission, a change ratio of the filament temperature in the fall cooled by natural heat radiation is milder than a change ratio of the filament temperature in the rise heated by the rush current.

(3) The luminance change just after the visible light generation in the bulb lamp emission rise is apparently slower than the case where the energy increases without the color temperature change due to influences of the color temperature change and the luminosity.

(4) The luminance change just after the bulb lamp emission fall is apparently faster than the case where the energy decreases without the color temperature change due to influences of the color temperature change and the luminosity.

(5) In the case where the LED is driven by the constant voltage drive type PWM control, the luminance is rapidly decreased in the tail portion of the fall of emission if the temporal change of the duty cycle is controlled by the theoretical value.

Figure 16:
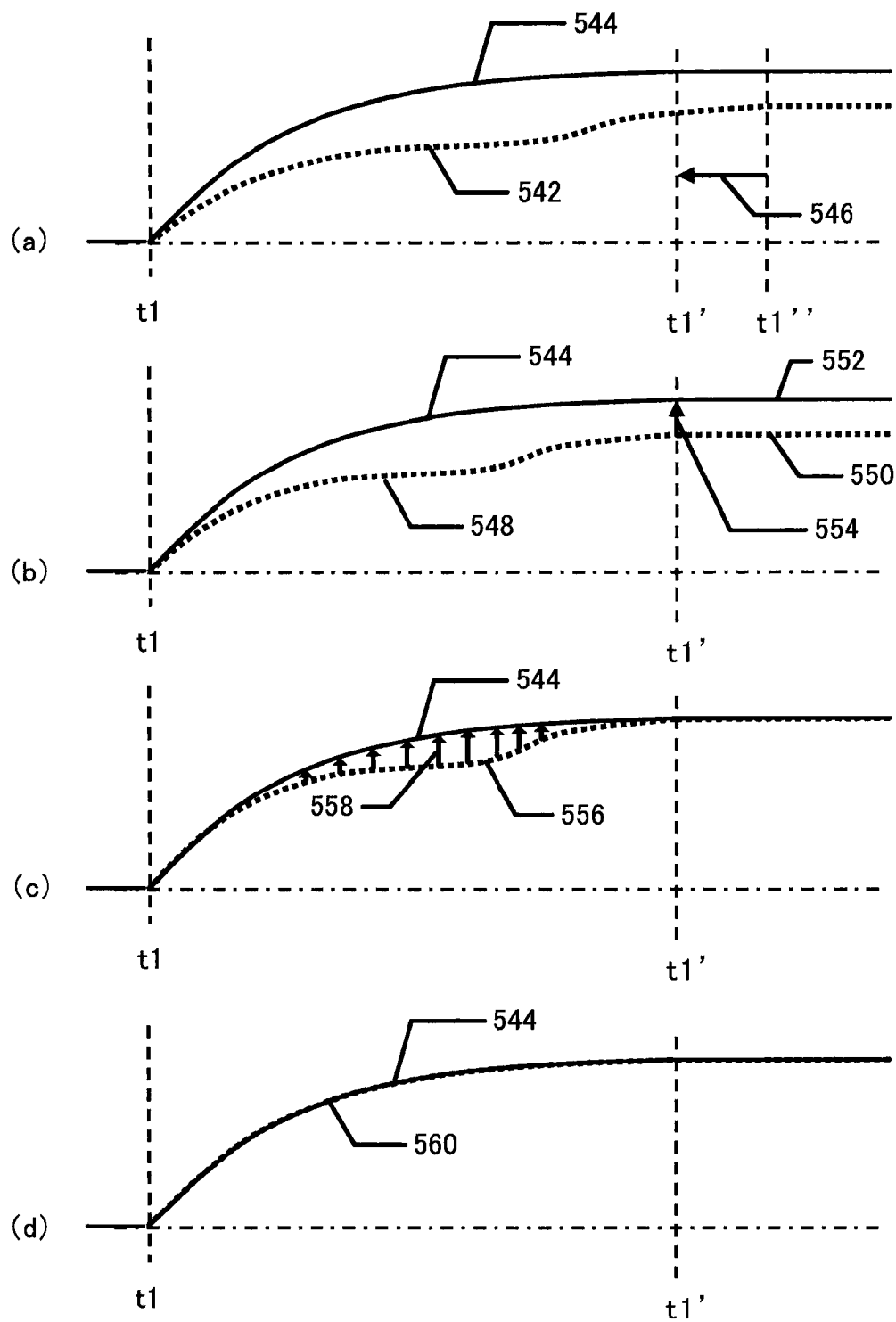
FIG. 16 is a graph illustrating a method of determining data of a lamp emission data table by actual measurement.

The data of the lamp emission data table 524 may be determined in a theoretical manner based on the above-described characteristics (1) to (5), or it may be determined based on the actual measurement. In this case too, it is necessary to perform the actual measurement so as to simulate turn on and off of the bulb lamp apparently to human eyes by considering the difference of light emission spectrum between the LED and the bulb lamp, influences of the color temperature in the rise and the fall of the light emission of the bulb lamp, and the relevant luminosity. FIG. 16 is a graph illustrating a method of determining data of the lamp emission data table 524 by the actual measurement. Hereinafter, the procedure of the method of determining the lamp emission data table by the actual measurement will be described with reference to FIG. 16.

(1) First, an optical sensor having a spectral sensitivity corresponding to the human luminosity is prepared.

(2) Next, an initial value of the data is set appropriately and stored as the lamp emission data table 524 in Example 6 illustrated in FIG. 12. The initial value data may be any value theoretically, but it is preferable that data considered being close to the lamp emission data should be the initial value so that efficiency in the following procedure becomes better.

(3) Example 6 illustrated in FIG. 12 giving the above-described initial value is made work to turn on the parking brake lamp 502, and luminance change data of the light emission rise is obtained with the prepared optical sensor. The actual measurement data of the LED emission is indicated by symbol (a) in FIG. 16 with a broken line 542. In this data, the light emission starts at t1 and reaches the maximum luminance at t1", and t1" is set appropriately.

(4) Next, the bulb lamp to be simulated is turned on, and the luminance change data in the rise of emission is obtained with the same optical sensor. The actual measurement data of the bulb lamp emission in this case is indicated by symbol (a) in FIG. 16 with a solid line 544. In this data, the light emission starts at t1 and reaches the maximum luminance at t1'.

(5) After the above-described actual measurement, the actual measurement data of the LED emission 542 is normalized to the actual measurement data of the bulb lamp emission 544. First, the time width from t1 when the actual measurement value of the LED emission luminance reaches the maximum luminance to t1" is normalized to the time width from t1 to t1'. In the case of symbol (a) in FIG. 16, the former is longer than the latter. Therefore, as indicated by the arrow 546, the data time axis between t1 and t1" is compressed as a whole so that t1" corresponds to t1'. A result of this is indicated by symbol (b) in FIG. 16 with a broken line 548.

(6) Next, the maximum luminance 550 of the LED emission actual measurement value is normalized to the maximum luminance 552 of the bulb lamp emission actual measurement value. In the case of symbol (b) in FIG. 16, the former is lower than the latter. Therefore, as indicated by the arrow 554, the data in which the time axis between t1 and t1' is normalized so that the maximum luminance 550 corresponds to the maximum luminance 552 is expanded as a whole in the luminance axis direction. A result of this is indicated by symbol (c) in FIG. 16 with a broken line 556.

(7) Next, correction of the LED emission actual measurement value 556 normalized as described above is performed. In the correction, the normalized LED emission actual measurement value and the bulb lamp emission actual measurement value are sampled sequentially along the time axis direction, so that a difference between the luminance data at the same time is determined. Then, this difference value is added to the data of the normalized LED emission actual measurement value 556 at the corresponding time. Thus, the addition result corresponds to the actual measurement data of the bulb lamp emission 544 as indicated by the arrow 558. A result of this is indicated by symbol (d) in FIG. 16 with a broken line 560.

(8) The data obtained as described above is overwritten on the initial value as the lamp emission data table 524 and is stored.

(9) Thus, the lamp emission data table 524 is obtained theoretically. If Example 6 illustrated in FIG. 12 is made work to turn on the parking brake lamp 502 based on the lamp emission data table 524, the actual measurement value obtained by the optical sensor is not always equal to the bulb lamp emission actual measurement value. Therefore, the above-described procedure of the steps (3) to (8) is repeated until the both correspond to each other, so that the light emission data table 524 approaches the bulb lamp emission actual measurement value.

With the above-described method, the data of the lamp emission data table 524 is determined by the actual measurement. Note that the above description and FIG. 16 are related to the rise of light emission, but the data of the fall of the light emission can also be determined by the same method. Note that the data obtained by the actual measurement as described above may be further corrected in the control of the fall of emission, so that the fall of emission reaches not zero luminance but a predetermined duty.

Figure 17:
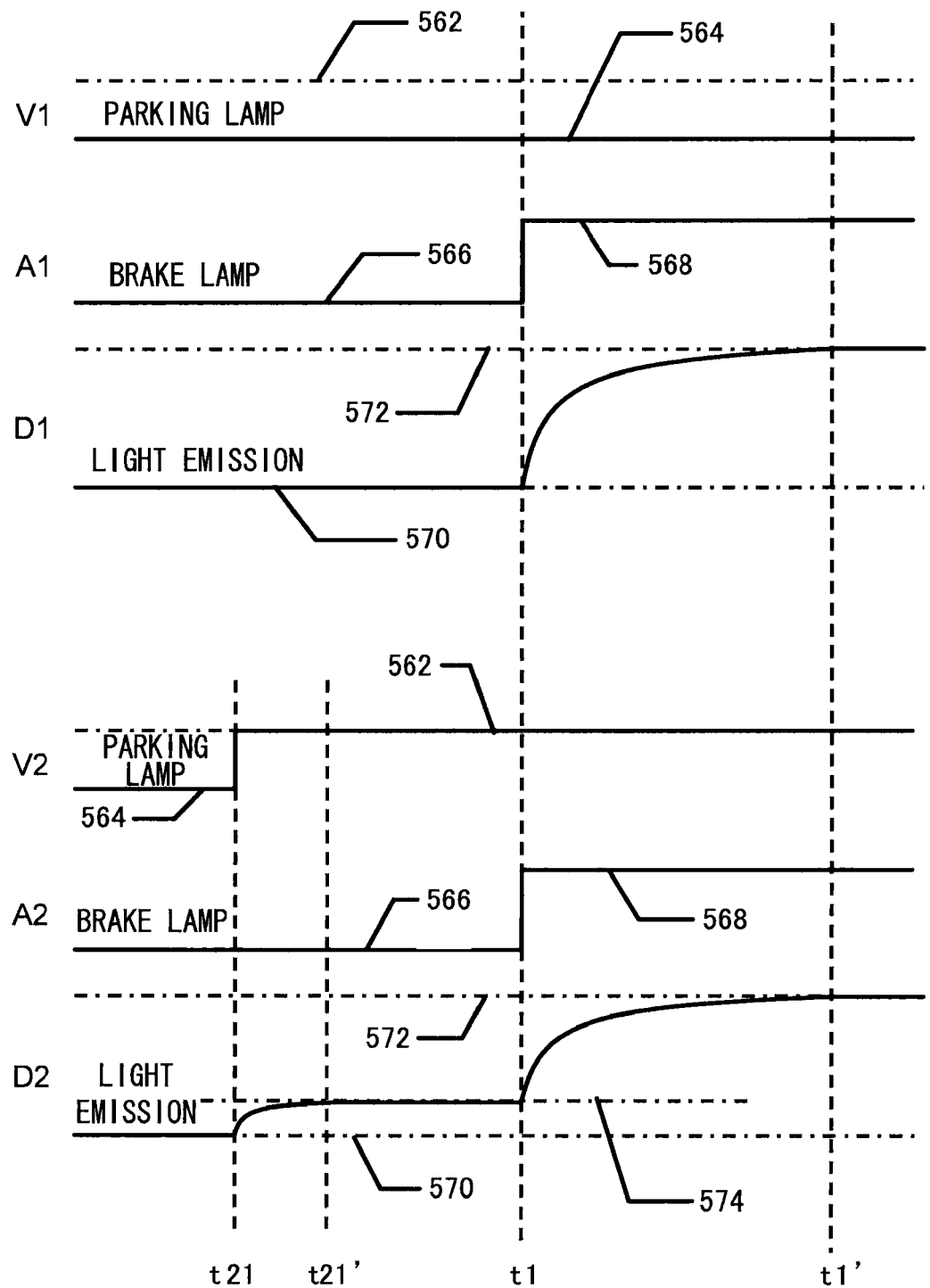
FIG. 17 is a waveform diagram illustrating depressed in the case where a parking lamp is turned on, and in the case where it is turned off in Example 6.

FIG. 17 is a waveform diagram illustrating a luminance change of the parking brake lamp 502 in combination of operations of the parking lamp operation part 510 and the brake operation part 512 in Example 6. Symbols V1, A1 and D1 in FIG. 17 correspond to the cases where the brake pedal is depressed in the daytime, and symbol V2, A2, D2 in FIG. 17 correspond to the cases where the parking lamp is first turned on and in this state the brake pedal is depressed.

The output from the parking lamp operation part 510 varies between a high level 562 and a low level 564 as indicated by symbol V1 in FIG. 17. Since the parking lamp is usually turned off in the daytime, it is the low level 564. When the brake pedal is depressed at time t1 in this state, the output of the brake operation part 512 varies from the low level 566 to the high level 568 as indicated by symbol A1 in FIG. 17. Along with this, the parking brake lamp 502 rises from the luminance zero level 570 at time t1 and reaches a maximum luminance level 572 at the duty of 100% at time t1' as indicated by symbol D1 in FIG. 17.

On the other hand, when the parking lamp is turned on in the nighttime, the output from the parking lamp operation part 510 varies from the low level 564 to the high level 562 at time t21 for example, as indicated by symbol V2 in FIG. 17. Along with this, the parking brake lamp 502 rises from the luminance zero level 570 at time t21 and reaches a parking lamp turn-on level 574 at the duty of 7% at time t21' as indicated by symbol D2 in FIG. 17. After that, it is turned on steadily with the duty of 7%.

Next, when the brake pedal is depressed at time t1, the output of the brake operation part 512 varies from the low level 566 to the high level 568 as indicated by symbol A2 in FIG. 17. Along with this, the parking brake lamp 502 further rises from the parking lamp turn-on level 574 at time t1 and reaches the maximum luminance level 572 at the duty of 100% at time t1' as indicated by symbol D2 in FIG. 17.

In this case, the time period from time t1 when the brake pedal is depressed to time t1' when the parking brake lamp 502 reaches the maximum luminance level 572 is the same as the time period from the luminance zero to the maximum luminance level in the daytime. On the other hand, the duty varies from 0% to 100% in the daytime while it rises from 7% to 100% when the parking lamp is turned on.

In this way, there are prepared different tables as the lamp emission data table 524 for the daytime in which the parking lamp is not turned on and for the nighttime in which the parking lamp is turned on. One of them is adopted in accordance with whether or not the parking lamp is turned on.

Figure 18:
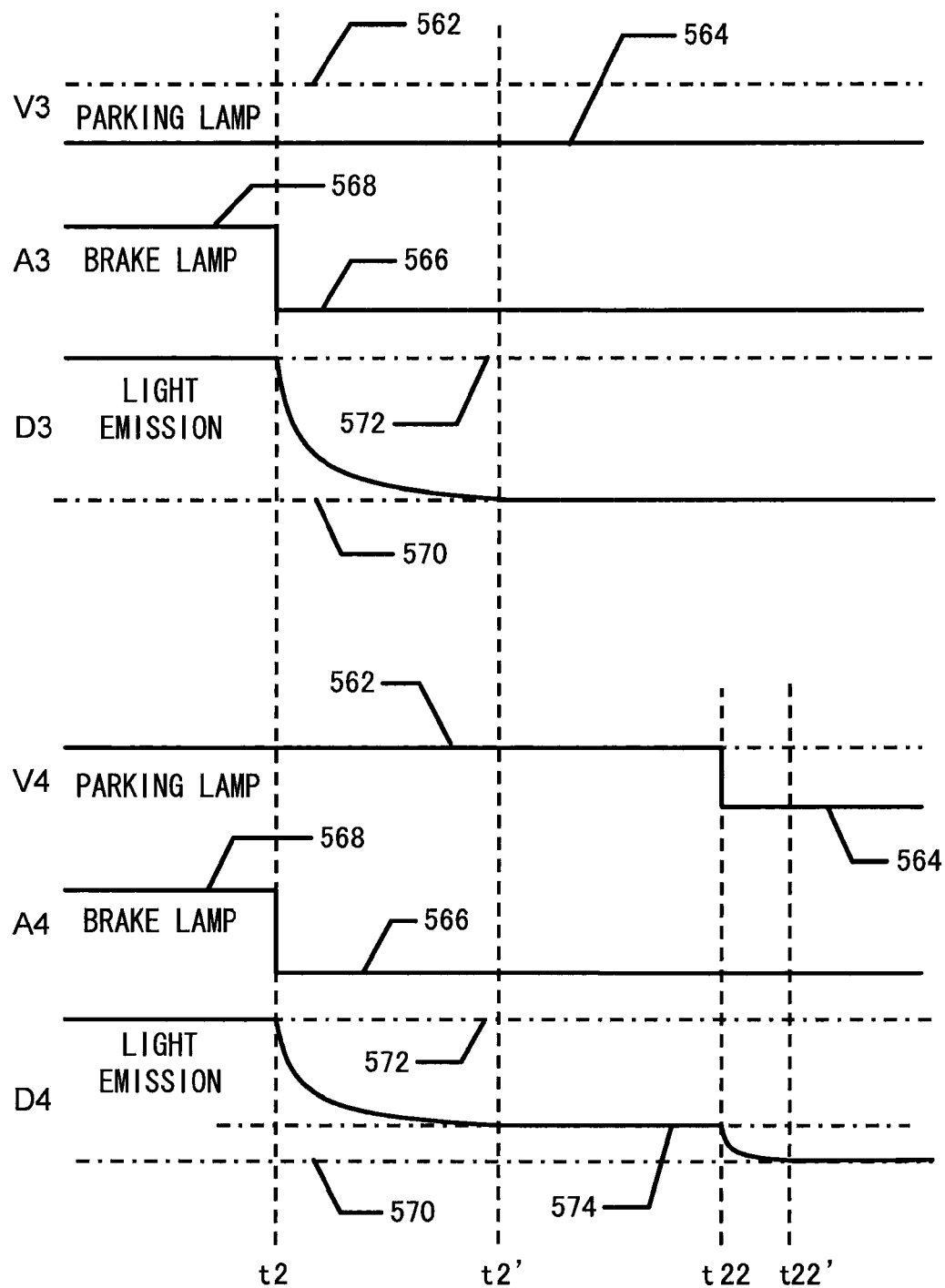
FIG. 18 is a waveform diagram illustrating luminance change of the parking brake lamp when the brake pedal is released in the case where the parking lamp is turned on, and in the case where it is turned off in Example 6.

FIG. 18 is similar to FIG. 17 and illustrates a waveform diagram in the case where the brake is released in Example 6. Similarly to FIG. 17, symbols V3, A3 and D3 in FIG. 18 correspond to the cases where the brake is released in the daytime, and symbols V4, A4 and D4 in FIG. 18 correspond to the cases where the brake is released in the nighttime while the parking lamp is turned on, and after that the parking lamp is turned off.

Similarly to FIG. 17, the output from the parking lamp operation part indicated by symbol V3 in FIG. 18 is at the low level 564 in the daytime. When the brake is released at time t2 in this state, the output of the brake operation part 512 varies from the high level 568 to the low level 566 as indicated by symbol A3 in FIG. 18. Along with this, the parking brake lamp 502 falls from the maximum luminance level 572 at the duty of 100% at time t2 and reaches to the luminance zero level 570 at time t2' as indicated by symbol D3 in FIG. 18.

On the other hand, if the parking lamp is turned on in the nighttime, the output from the parking lamp operation part 510 is at the high level 562 as indicated by symbol V4 in FIG. 18. When the brake is released at time t2, the output of the brake operation part 512 varies from the high level 568 to the low level 566 as indicated by symbol A4 in FIG. 18. Along with this, the parking brake lamp 502 falls from the maximum luminance level 572 at the duty of 100% at time t2 and reaches the parking lamp turn-on level 574 at the duty of 7% at time t2' as indicated by symbol D4 in FIG. 18. After that, it is turned on steadily at the duty of 7%.

Next, the parking lamp is turned off at time t22 for example, the output of the parking lamp operation part 510 varies from the high level 562 to the low level 564 as indicated by symbol V4 in FIG. 18. Then, along with this, the parking brake lamp 502 further falls from the parking lamp turn-on level 574 and reaches the duty zero level 570 at time t22' as indicated by symbol D4 in FIG. 18.

In this case too, the time period from time t2 when the brake is released to time t2' when parking brake lamp 502 reaches the parking lamp turn-on level 574 indicated by symbol D4 in FIG. 18 is the same as the time period from time t2 to the time when reaching the luminance zero level 570 in the daytime as indicated by symbol D3 in FIG. 18. On the other hand, the duty varies from 100% to 0% as indicated by symbol D3 in FIG. 18 while it varies from 100% to 7% in the turned-on state of the parking lamp.

In this way, there are prepared different tables as the lamp emission data table 524 also in the fall control of the parking brake lamp 502, which include a table for the daytime in which the parking lamp is not turned on and a table for the nighttime in which the parking lamp is turned on. One of the tables is adopted in accordance with whether or not the parking lamp is turned on.

Figure 19:
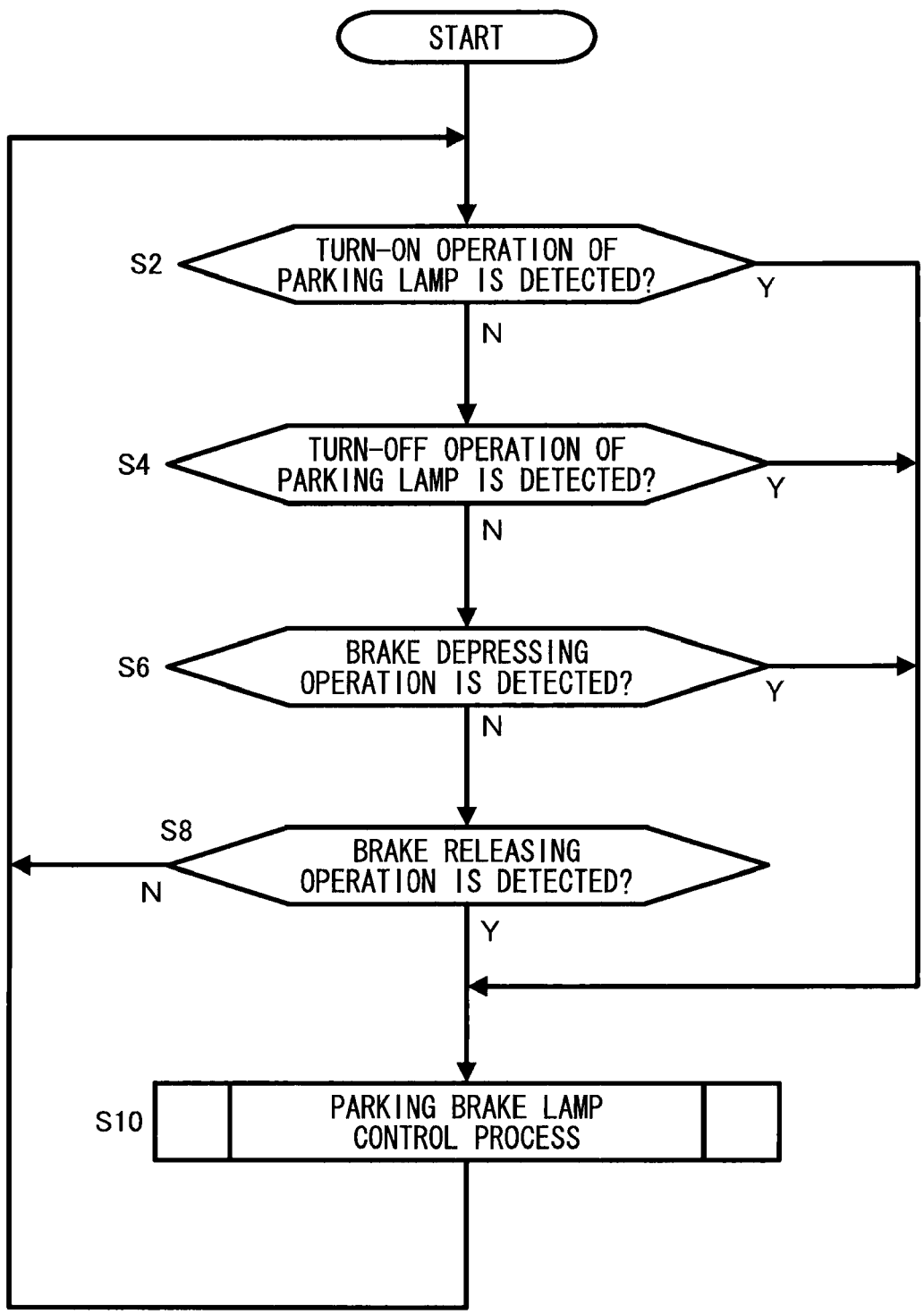
FIG. 19 is a basic flowchart illustrating a function of a CPU in Example 6.

FIG. 19 is a basic flowchart illustrating a function of the CPU 520 of Example 6 illustrated in FIG. 12, which starts when a battery is connected to the vehicle. When the process flow starts, it is detected in Step S2 whether or not a turn-on operation of the parking lamp was performed in the parking lamp operation part 510. If it is not detected, the process goes to Step S4, and it is detected whether or not a turn-off operation of the parking lamp was performed in the parking lamp operation part 510. If it is not detected, the process goes to Step S6. In Step S6, it is detected whether or not a depressing operation of the brake was performed in the brake operation part 512. If it is not detected, the process goes to Step 8, and it is detected whether or not a releasing operation of the brake was performed in the brake operation part 512. Then, if it is not detected, the process goes back to Step S2.

As described above, detection of the turn-on or the turn-off operation of the parking lamp or the operation of the brake is waited. If any of them is detected, the process goes to the parking brake lamp control process in Step S10. The detail thereof will be described later. When the parking brake lamp control process in Step S10 is finished, the process goes back to Step S2. In this way, the process from Step S2 to Step S10 is repeated, so that the turn-on or the turn-off operation of the parking lamp or the brake operation is detected, and the lamp control process is performed in accordance with the detection.

Figure 20:
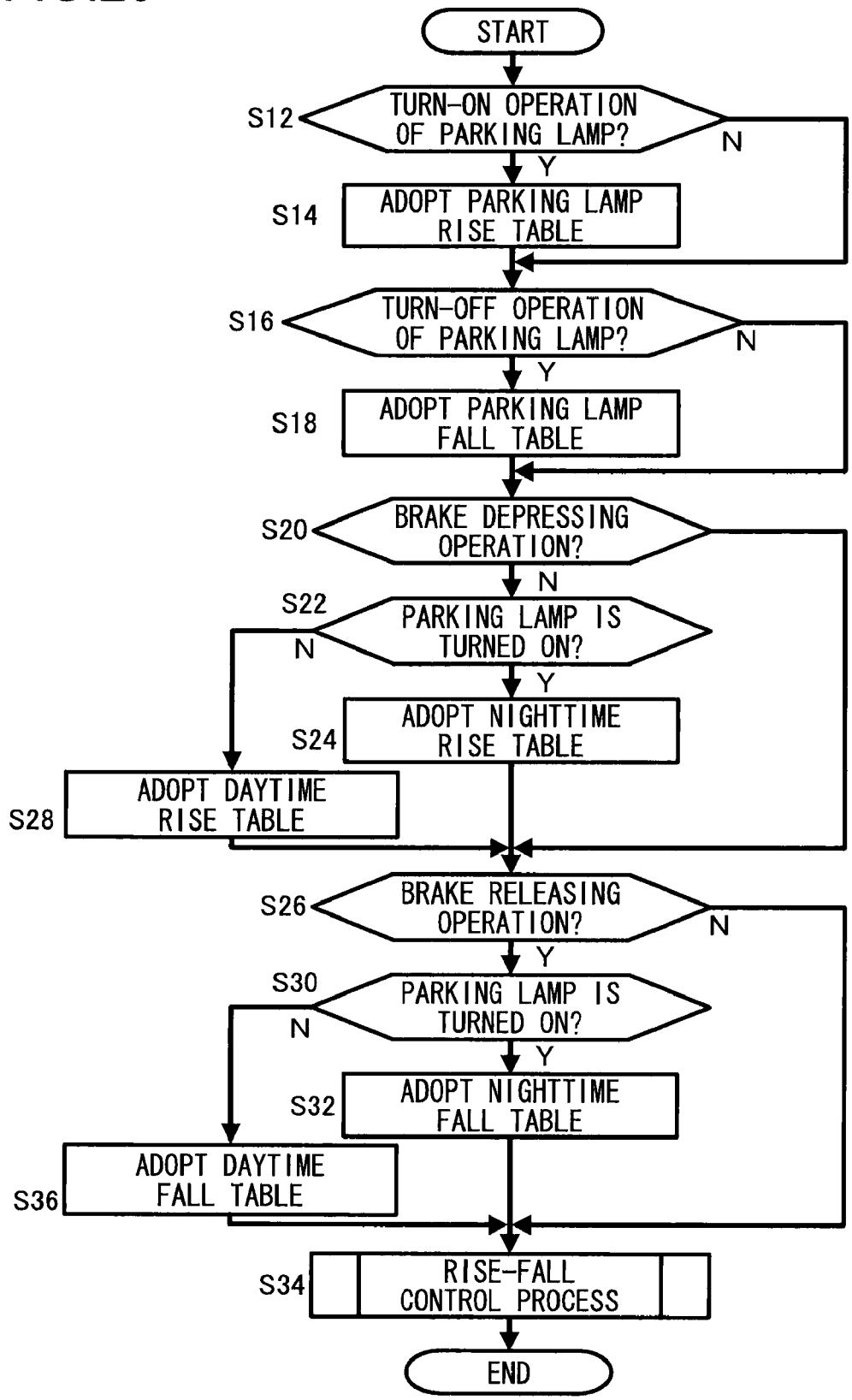
FIG. 20 is a flowchart illustrating a detail of Step S10 in FIG. 19.

FIG. 20 is a flowchart illustrating detail of the parking brake lamp control process in Step S10 illustrated in FIG. 19. When the process flow starts, it is checked in Step S12 whether or not the detected operation is the turn-on operation of the parking lamp. If it is true, the process goes to Step 14, in which the parking lamp rise table is adopted among the lamp emission data table 524, and the process goes to Step S16. On the other hand, if it is decided in Step S12 that the detected operation is not the turn-on operation of the parking lamp, the process goes directly to Step S16.

In Step S16, it is checked whether or not the detected operation is the turn-off operation of the parking lamp. If it is true, the process goes to Step 18, in which the parking lamp fall table is adopted among the lamp emission data table 524, and the process goes to Step S20. On the other hand, if it is decided in Step S16 that the detected operation is not the turn-off operation of the parking lamp, the process goes directly to Step S20.

In Step S20, it is checked whether or not the detected operation is the depressing operation of the brake. If it is true, the process goes to Step 22, in which it is checked whether or not the parking lamp is turned on. If it is turned on, the rise table for the nighttime is adopted among the lamp emission data table 524 in Step S24, and the process goes to Step S26.

In addition, if it is decided in Step S22 that the parking lamp is not turned on, the rise table for the daytime is adopted among the lamp emission data table 524 in Step S28, and the process goes to Step S26.

On the other hand, if it is decided in Step S20 that the detected operation is not the brake depressing operation, the process goes directly to Step S26.

In Step S26, it is checked whether or not the detected operation is the brake releasing operation. If it is true, the process goes to Step 30, in which it is checked whether or not the parking lamp is turned on. If it is turned on, the fall table for the nighttime is adopted among the lamp emission data table 524 in Step S32, and the process goes to Step S34.

In addition, if it is decided that the parking lamp is not turned on in Step S30, the fall table for the daytime is adopted among the lamp emission data table 524 in Step S36, and the process goes to Step S34.

On the other hand, if it is decided in Step S26 that the detected operation is not the brake releasing operation, the process goes directly to Step S34.

In Step S34, the rise-fall control process of the parking brake lamp is performed based on the table adopted until here among the lamp emission data table 524, and then the process flow is finished. Detail of Step S34 will be described as follows.

Figure 21:
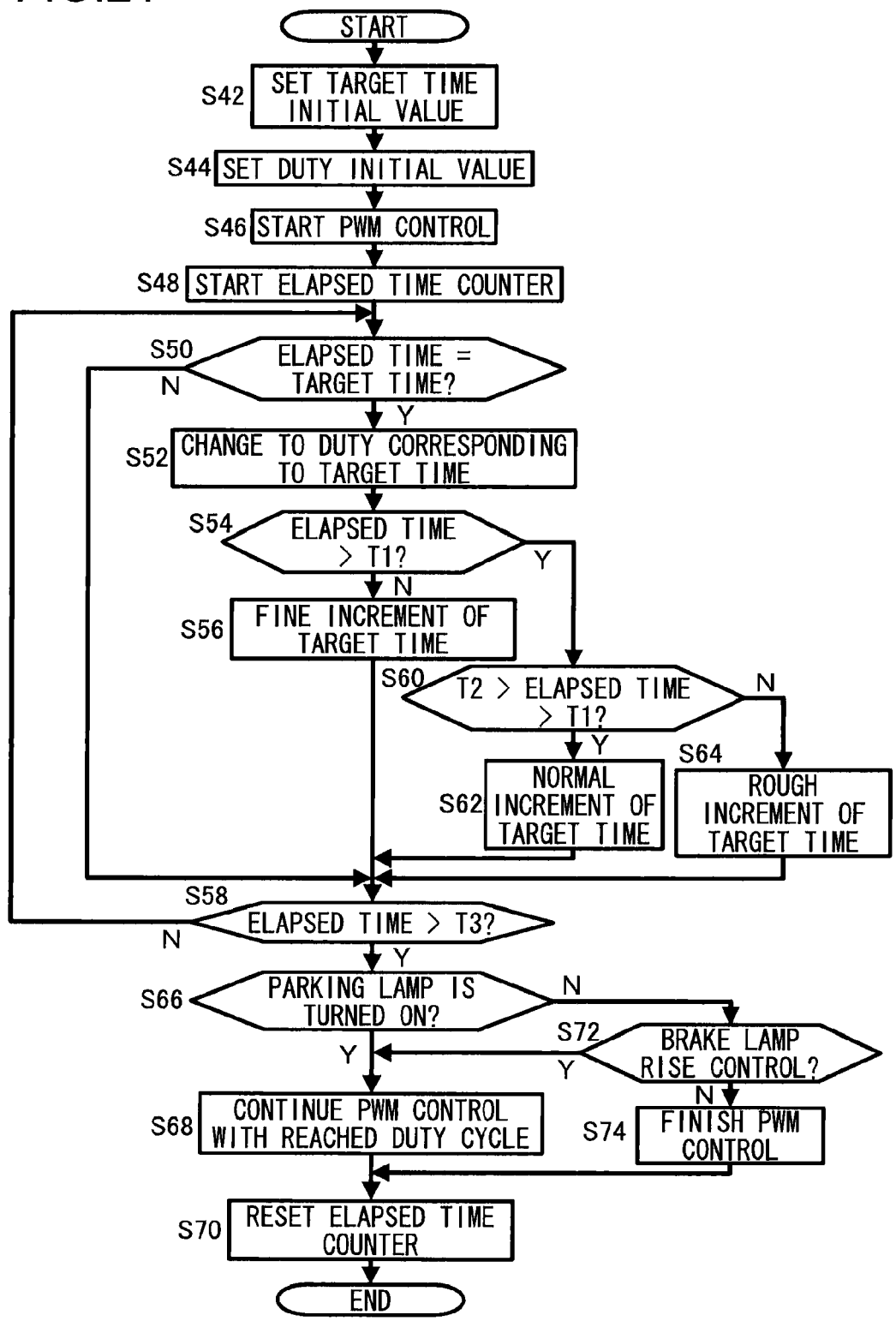
FIG. 21 is a flowchart illustrating a detail of Step S34 in FIG. 20.

FIG. 21 is a flowchart illustrating detail of the rise-fall control process in Step S34 illustrated in FIG. 20. When the process flow starts, an initial value of the next target time for changing the duty is set in Step S42. This initial value is 1 millisecond, for example. Next, the initial value of the duty is set in Step S44. This initial value is either one of 0%, 7% or 100% depending on which table is adopted from the lamp emission data table 524 in the process flow illustrated in FIG. 20.

After the above-described setting, the PWM control is started in Step S46, and count of the elapsed time after the start of the PWM control is started in Step S48 to go to Step S50.

In Step S50, it is checked whether or not the elapsed time is equal to the target time. If it is equal, the process goes to Step S52 in which the set value is changed to the duty corresponding to the target time. Then, it is checked in Step S54 whether or not the elapsed time exceeds T1. T1 is 100 msec for example. If the elapsed time does not reach T1, the process goes to Step S56 in which the target time is increased for fine adjustment, and the process goes to Step S58. This increase for fine adjustment is 1 msec for example. As a result of this, the initial value of the target time set in Step S42 is increased from 1 msec to 2 msec.

On the other hand, if it is decided in Step S54 that the elapsed time has exceeded T1, the process goes to Step 60 in which it is checked whether or not the elapsed time is between T1 and T2 that is longer than T1. T2 is 300 msec for example. If the elapsed time is between them, the process goes to Step S62 in which the target time is increased for normal adjustment, and the process goes to Step S58. This increase for normal adjustment is 2 msec for example. As a result of this, if it has reached the target time of 100 msec to go to Step S62, the target time is increased to be 102 msec.

In addition, if it is decided in Step S60 that the elapsed time is not between T1 and T2, it means that the elapsed time has exceeded T2. Therefore, the process goes to Step S64 in which the target time is increased for rough adjustment, and the process goes to Step S58. This increase for normal adjustment is 4 msec for example. As a result of this, if it has reached the target time of 300 msec to go to Step S64, the target time is increased to be 304 msec.

Further, if the elapsed time has not reached the target time in Step S50, the duty is maintained, and the process goes directly to Step S58.

In Step S58, it is checked whether or not the elapsed time has exceeded T3 that is longer than T2. If it has not exceeded, the process goes back to Step S50. After that, the process from Step S50 to Step S64 is repeated until the elapsed time exceeds T3 in Step S58. T3 is 500 msec for example, which corresponds to the time until the rise control or the fall control by changing the duty cycle is finished.

As described above, the duty is changed at every elapsed time for the fine adjustment in accordance with the table adopted from the lamp emission data table 524 until the elapsed time after the start of the PWM control reaches T1. In addition, the duty is changed in accordance with the table adopted from the lamp emission data table 524 at every elapsed time for the normal adjustment from T1 to T2, and at every elapsed time for the rough adjustment after T2.

If it is decided in Step S58 that the elapsed time has exceeded T3, the process goes to Step 66 in which it is checked whether or not the parking lamp is turned on. If it is turned on, the process goes to Step 68 in which it is instructed to fix the reached duty and to continue the PWM control. This reached duty is 100% in the rise control and is 7% in the fall control. Then, the elapsed time counter is reset in Step S70, and the process flow is finished.

On the other hand, if the parking lamp is not turned on in Step S66, the process goes to Step 72 in which it is checked whether or not the rise control of the brake lamp is to be performed. If it is true, the process goes to Step 68, and the PWM control is continued with the reached duty cycle at 100% in this case. On the other hand, if it is detected in Step S72 that it is not the brake lamp rise, it means to be the brake lamp fall or the parking lamp fall when the parking lamp is not turned on. Therefore, the duty becomes zero in either case, so the PWM control is finished in Step S74, and the process flow is finished.

Figure 22:
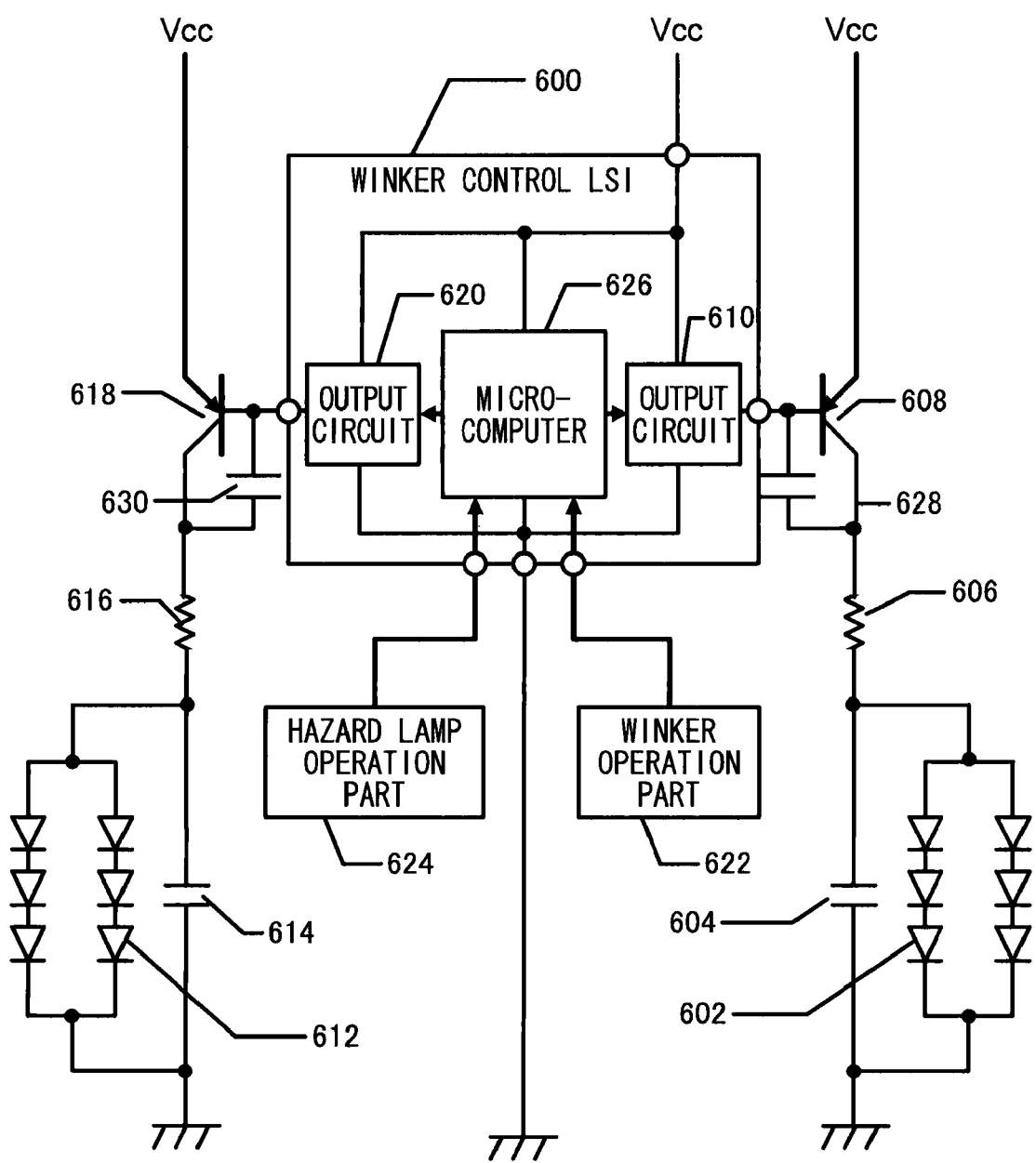
FIG. 22 is a block diagram of Example 7 according to the embodiment of the present invention and illustrates an application to the vehicle winker controller.

FIG. 22 is a block diagram of Example 7 according to the embodiment of the present invention. The controller is similar to that of Example 6 illustrated in FIG. 12 in many points and is applied to not the control of the parking brake lamp but the control of a vehicle winker.

The vehicle winker controller illustrated in FIG. 22 is controlled by a winker control LSI 600, and a right winker 602 constituted of six LEDs is connected in parallel to a voltage stabilizing capacitor 604. A switching transistor 608 is connected to the parallel connection via a current limiting resistor 606 so as to control the right winker 602 based on a signal from an output circuit 610.

The left winker side is similar to the above-described structure of the right winker side. Structures of elements 612 to 620 correspond to structures of elements 602 to 610, respectively. In the structures of the left and the right winkers, elements denoted by numerals having the same one lower digit are correspond to each other. With the above-described circuit structure, the PWM control of the constant voltage control type is performed also in Example 7.

When a winker operation part 622 is operated, the right winker 602 and the left winker 612 are controlled to blink with the duty cycle of 0% to 100% by the PWM control of the switching transistor 608 or the switching transistor 618. In addition, when a hazard lamp operation part 624 is operated, both the right winker 602 and the left winker 612 are controlled to blink simultaneously. Note that the switching transistors 608 and 618 correspond to the above-mentioned emission control section.

Such the control is performed by a microcomputer 626 (control section) of the winker control LSI 600. The microcomputer 626 delivers the PWM-controlled pulse from the output circuit 610 and/or the output circuit 620 in accordance with an operation signal input from the winker operation part 622 or the hazard lamp operation part 624. In other words, the microcomputer 626 and the output circuits 610 and 620 correspond to the PWM signal generating section. The capacitor

628 and the capacitor 630 are similar to the capacitor 518 illustrated in FIG. 12 and prevent the switching transistors 608 and 618 respectively from being broken down by rush current.

The microcomputer 626 has a similar structure to the microcomputer 514 illustrated in FIG. 12, and includes a CPU, a memory and an input/output section. It also stores a lamp emission data table, and the CPU refers to the lamp emission data table for changing the duty cycle as time passes similarly to FIG. 12, so that the right winker 602 and the left winker 612 blink so as to simulate a bulb lamp.

FIG. 23 is similar to FIG. 2 and illustrates an operation of the winker controller by a waveform diagram. In FIG. 2, symbol A and symbol B are the same as symbol A and symbol B in FIG. 2, in which PWM control end timings t1' in the turn-on rise and t3' and PWM control end timings t2' and t4' in the turn-on rise are added to the rise timings t1 and t3 in the blink and the fall timings t2 and t4 in the blink. These PWM control end timings t1', t2', t3' and t4' are the same as those in FIGS. 3, 4, 13 and 14.

Note that the time period from the fall timing t2 of the blink to the timing t2' until reaching the luminance zero is controlled to be longer than the time period from the rise timing t1 of the blink to the timing t1' until reaching the maximum luminance in FIG. 23. This simulates that the turn-on rise of a bulb lamp becomes faster than the fall due to influence of the rush current.

Since the blink is repeated in the winker control, it is possible to adopt not only the control in which the next turn-on rises at timing t3 after the previous turn-on has completely fallen to the duty at zero at timing t2' as indicated by symbol B in FIG. 23 but also the control in which the next turn-on rises at a midpoint where the previous turn-on is falling. This control simulates that the next turn-on rises while the bulb lamp is turned off and remains lighting in the blink of the winker. This also simulates the tendency of the filament of the bulb lamp lasting long in the luminance change due to natural cooling at the turn-off fall timing. A waveform diagram in such the control is indicated by symbol B' in FIG. 23.

Symbol B' in FIG. 23 illustrates the control adopting the lamp emission data table in which the luminance reaches the zero level 702 at a time point after t3 in the fall control starting from the timing t2. When the winker blink rise timing t3 comes in the case where such the table is adopted, the luminance level is still at a predetermined level 704. Here, the fall control is stopped and is switched to the rise control. The duty cycle of the predetermined luminance level 704 is 1% or the like, for example. Therefore, also in the turn-on rise from t3, the lamp emission data table is used not from a part of the duty cycle at zero but from a part of the duty cycle at 1% in the above-described example. If the lamp emission data table for the rise is used from a midpoint in this way, the timing t3" of reaching the maximum luminance is also earlier than t3'. Detail of such the control will be described later.

As described above, when the control as indicated by symbol B' in FIG. 23 is performed, the duty control is performed in different ways between the first blink and the second and following blinks. Further, when the control as indicated by symbol B' in FIG. 23 is performed, it is possible to prepare another table for performing the rise from the duty cycle of 1% to the duty cycle of 100% in the period from t3 to t3" as one of the lamp emission data tables for example, instead of using the same table as that used for the rise between t1 and t1' from a midpoint. In addition, if it is fixed that the part after t3 is not necessary also for the table for the fall, it is sufficient to prepare the part to the duty cycle at 1% for example.

In addition, in the operation of the winker or the hazard lamp, fall the blink-stop operation is not always performed during the fall or after the fall before the next rise is performed, but the stop operation may be performed during the rise. Symbol A" in FIG. 23 and symbol B" in FIG. 23 illustrate waveforms of the control in the case where the stop operation is performed during the rise with reference to an example where the control illustrated in FIG. 23B' is performed.

Symbol A" in FIG. 23 illustrates the case where the blink-stop operation is performed at the timing of t50 between t3 and t4, which is a period for turning on in a usual case. In this case, as indicated by symbol B" in FIG. 23, the rise control is stopped at the timing of t50 and is switched to the fall control. If such the switching is performed at the duty cycle of 80% for example, the lamp emission data table for the fall is also used not from the part of the duty cycle at 100% but from the part of the duty cycle at 80%. Then, at the timing of t51, the duty cycle fall to 0%. Detail of such the control will be described later.

FIG. 24 is similar to FIG. 23 and a waveform diagram illustrating another example of the fall control. In FIG. 24, symbol A, symbol B and symbol B' are respectively the same as symbol A, symbol B and symbol B' in FIG. 23 completely and are referred to again for comparison.

In symbol B' in FIG. 24, the rise control is performed at a midpoint timing t3 in the fall control. In contrast, in symbol B'" in FIG. 24, the fall control is finished at timing t2' similarly to symbol B in FIG. 24. However, the reached duty is not 0% but corresponds to a predetermined luminance level 704 that is the same as the duty cycle at which the fall control is switched to the rise control as indicated by symbol B' in FIG. 24 and is 1% for example.

As described above, in symbol B'" in FIG. 24, the duty cycle is not changed after timing t2', and the PWM control is performed with a constant duty cycle corresponding to a predetermined luminance level 702 while waiting the next turn-on rise. Thus, similarly to symbol B' in FIG. 24, the state of the long-lasting blink fall is realized artificially. This control of making the PWM control reach a predetermined duty other than zero and maintaining the same in the fall control will be referred to as a "long tail process".

When the control is performed so that the next light emission rises before the previous light emission falls completely, the above-described simple "long tail process" may be performed instead of strict control of the tail part of the fall control, so that the natural brink can be simulated by performing the PWM control with a fixed duty cycle.

Note that the "long tail process" is useful not only for the case where the above-described simple substitute control is the purpose but also for a realistic method of correcting a problem that may occur when the duty cycle decreases due to the situation illustrated in FIG. 15.

Figure 25:
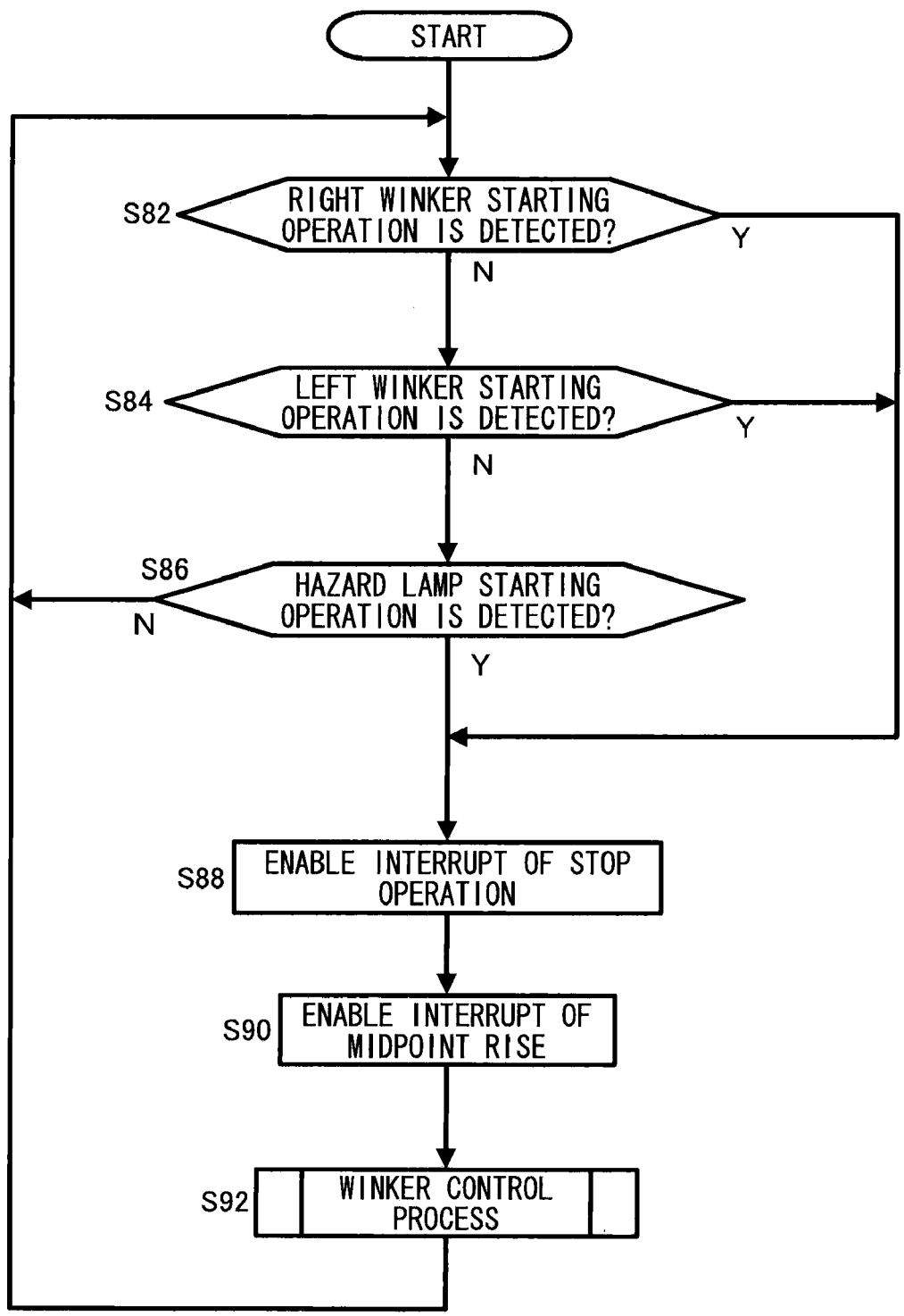
FIG. 25 is a basic flowchart illustrating a function of a CPU of a microcomputer in Example 7.

FIG. 25 is a basic flowchart illustrating functions of the CPU of the microcomputer 626 in Example 7 illustrated in FIG. 22, which starts when the battery is connected to the vehicle similarly to the case of the parking brake lamp control illustrated in FIG. 19.

When the process flow starts, it is detected in Step S82 whether or not a starting operation of the right winker 602 is performed by the winker operation part 622. If it is not detected, the process goes to Step 84, in which it is detected whether or not a starting operation of the left winker 612 is performed by the winker operation part 622. If it is not detected here too, the process goes to Step S86.

In Step S86, it is detected whether or not a hazard lamp starting operation is performed by the hazard lamp operation part 624. If it is not detected, the process goes back to Step S82.

As described above, it is waited that the operation of the winker operation part 622 or the hazard lamp operation part 624 is detected. If the either of them is detected, the process goes to Step 88 in which the process for enabling interrupt of the blink-stop operation by the winker operation part 622 or the hazard lamp operation part 624 is performed. Further, in Step S90, the process of enabling interrupt by a rise signal generation in the fall control is performed, and the process goes to Step S92. In Step S92, the winker control process is performed, and detail thereof will be described later.

Then, when the winker control process in Step S92 is finished, the process goes back to Step S82. Thus, the process from Step S82 to Step S92 is repeated, so that the winker control process is performed responding to the detection of the operation by the winker operation part 622 or the hazard lamp operation part 624.

Figure 26:
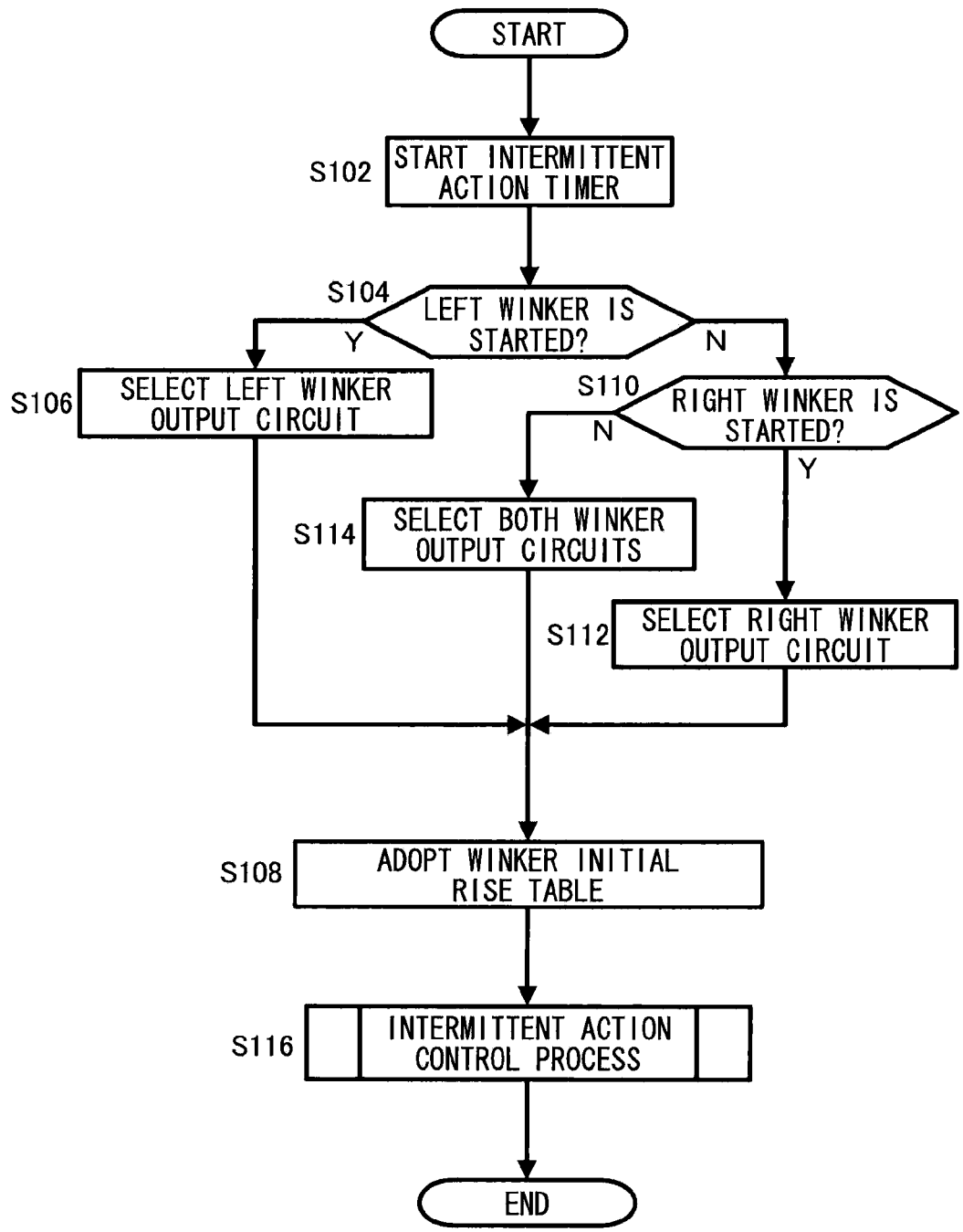
FIG. 26 is a flowchart illustrating a detail of Step S92 in FIG. 25.

FIG. 26 is a flowchart illustrating detail of the winker control process in Step S92 of FIG. 25. When the process flow starts, intermittent action timer for controlling the blink of the winker is started in Step S102, and the process goes to Step S104.

In Step S104, it is checked whether or not the starting operation of the left winker 612 is performed. If it is true, the process goes to Step S106 in which the microcomputer 626 in FIG. 22 delivers the PWM-controlled pulse only to the output circuit 620 for the left winker 612, and the process goes to Step S108. On the other hand, if it is confirmed in Step S104 that the starting operation of the left winker 612 is not performed, the process goes to Step S110.

In Step S110, it is checked whether or not the starting operation of the right winker 602 is performed. If it is true, the process goes to Step 112 in which the microcomputer 626 delivers the PWM-controlled pulse only to the output circuit 610 for the right winker 602, and the process goes to Step S108.

On the other hand, if it is confirmed in Step S110 that the starting operation of the right winker 602 is not performed, it means that the hazard lamp operation part 624 is operated. Therefore, the process goes to Step 114, in which the microcomputer 626 delivers the PWM-controlled pulse to both the output circuit 610 for the right winker 602 and the output circuit 620 for the left winker 612 simultaneously, and the process goes to Step S108.

In Step S108, the process of adopting a winker initial rise table is performed, and the process goes to Step S116 in which an intermittent action control process is performed. Detail of this process will be described as follows. When this process is finished, the process flow is finished.

Figure 27:
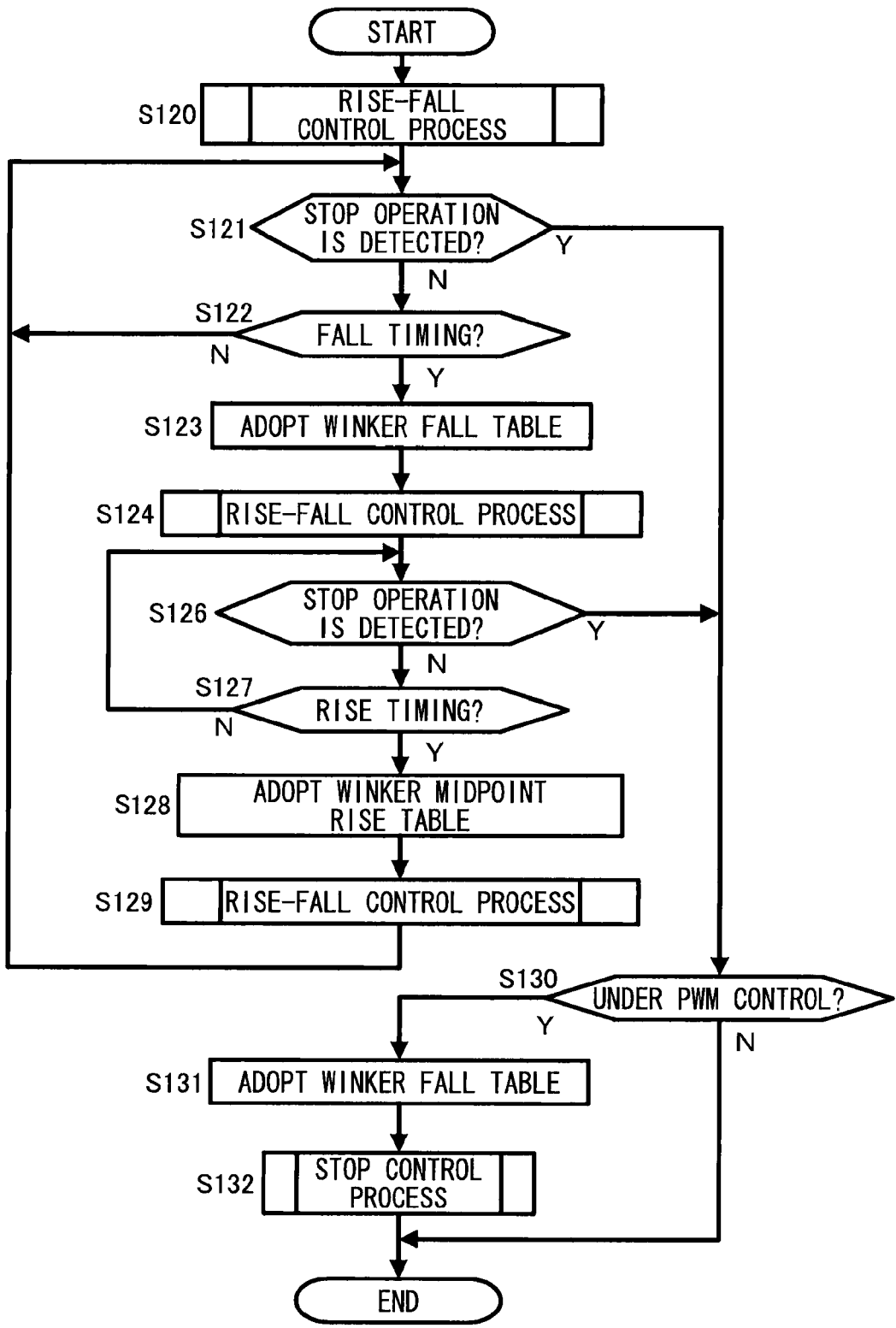
FIG. 27 is a flowchart illustrating a detail of an intermittent action control process in Step S116 in FIG. 26.

FIG. 27 is a flowchart illustrating detail of the intermittent action control process in Step S116 of FIG. 26. When the process flow starts, the rise-fall control process is performed in Step S120. In this case, the winker initial rise table adopted in Step S108 of FIG. 26 is used. Note that the rise-fall control process in Step S120 is basically the same as that in Example 6 illustrated in FIG. 21, but there are some differences. Therefore, it will be described again later.

When the process of Step S120 is finished, the process goes to Step 121, in which it is checked whether or not the blink-stop operation by the winker operation part 622 or the hazard lamp operation part 624 illustrated in FIG. 22 is detected. If it is not detected, the process goes to Step 122, in which it is checked whether or not the intermittent action timer that started in Step S102 of FIG. 26 indicates that the fall timing has come. If the fall timing has not come, the process goes back to Step S121. After that, the process in Step S121 and Step S122 is repeated unless the fall timing comes or the stop operation is detected.

If the fall timing is detected in Step S122, the process goes to Step 123, in which the winker fall table is adopted, and the process goes to Step S124. In Step S124, the rise-fall control process that is similar to that in Step S120 is performed. When it is finished, the process goes to Step S126.

In Step S126, it is checked whether or not the blink-stop operation is detected similarly to Step S121. If it is not detected, the process goes to Step 127, in which it is checked whether or not the intermittent action timer indicates that the rise timing has come. If the rise timing has not come, the process goes back to Step S126. After that, the process in Step S126 and Step S127 is repeated unless the rise timing comes or the stop operation is detected.

If the rise timing is detected in Step S127, the process goes to Step 128, in which a winker midpoint rise table is adopted, and the process goes to Step S129. In Step S129, the rise-fall control process is performed similarly to Step S120 or Step S124. When it is finished, the process goes back to Step S121.

After that, the process from Step S120 to Step S129 is repeated unless the stop operation is detected in Step S121 or Step S126, so that the rise and the fall of the blink is repeated as indicated by symbol B in FIG. 23.

Note that the winker midpoint rise table adopted in Step S128 of FIG. 27 and the winker initial rise table adopted in Step S116 of FIG. 26 are different corresponding to the various cases described above with reference to FIGS. 23 and 24, which are stored as lamp emission data table 524. However, if the control as indicated by symbol B in FIG. 23 is always performed for example, the rise tables may be the same.

In addition, even if different tables are necessary as the rise tables for the initial rise and a midpoint rise, the same table may be used for them in the case where it is possible to use the table from a midpoint or in the case where, the table date prepared for use between the duty cycle 0% and the duty cycle 100% is corrected in a proportional manner to be data between the duty cycle 1% and the duty cycle 100% for example. This will be described later.

The process flow illustrated in FIG. 27 is structured so that the stop operation is detected only in the period from the completion of one rise-fall control process to the start of the next rise-fall control process. This corresponds to that the stop operation is accepted only in the period between t1' and t2 as indicated by symbol B in FIG. 23 or in the period between t2' and t3 as indicated by symbol B'" in FIG. 24, for example. Therefore, even if the stop operation is performed in the period between t3 and t3' in the rise process as indicated by symbol A in FIG. 23 for example, the rise process is continued until t3'. After that, the fall process starts and the blink is stopped after it is finished. The present invention can be embodied also in this manner.

In contrast, the present invention can also be structured in such a manner that the rise process is started soon when the stop operation is detected at t50 between t3 and t3' in the rise process as described above with reference to symbol B" in FIG. 23 in addition to the above-described stopping process. This will be described later.

With reference to FIG. 27 again, when the stop operation is detected in Step S121 or in Step S126, the process goes to Step 130, in which it is checked whether or not the PWM control is being performed. If it is true, the process goes to Step S131. This case corresponds to the case where the stop operation is detected in the period between t1' and t2 as indicated by symbol B in FIG. 23 or symbol B" in FIG. 24 or in the period between t2' and t3 as indicated by symbol B'" in FIG. 24, for example. Then, the winker fall table is adopted Step S131, and the process goes to Step S132. In Step S132, a stop control process is performed, and the process flow is finished. Detail of the stop control process will be described later.

On the other hand, if it is confirmed in Step S130 that the PWM control is not being performed, it means that the stop operation is detected in the period between t2' and t3 as indicated by symbol B in FIG. 23. Then, the process flow is promptly finished. Thus, the blink is stopped.

Figure 28:
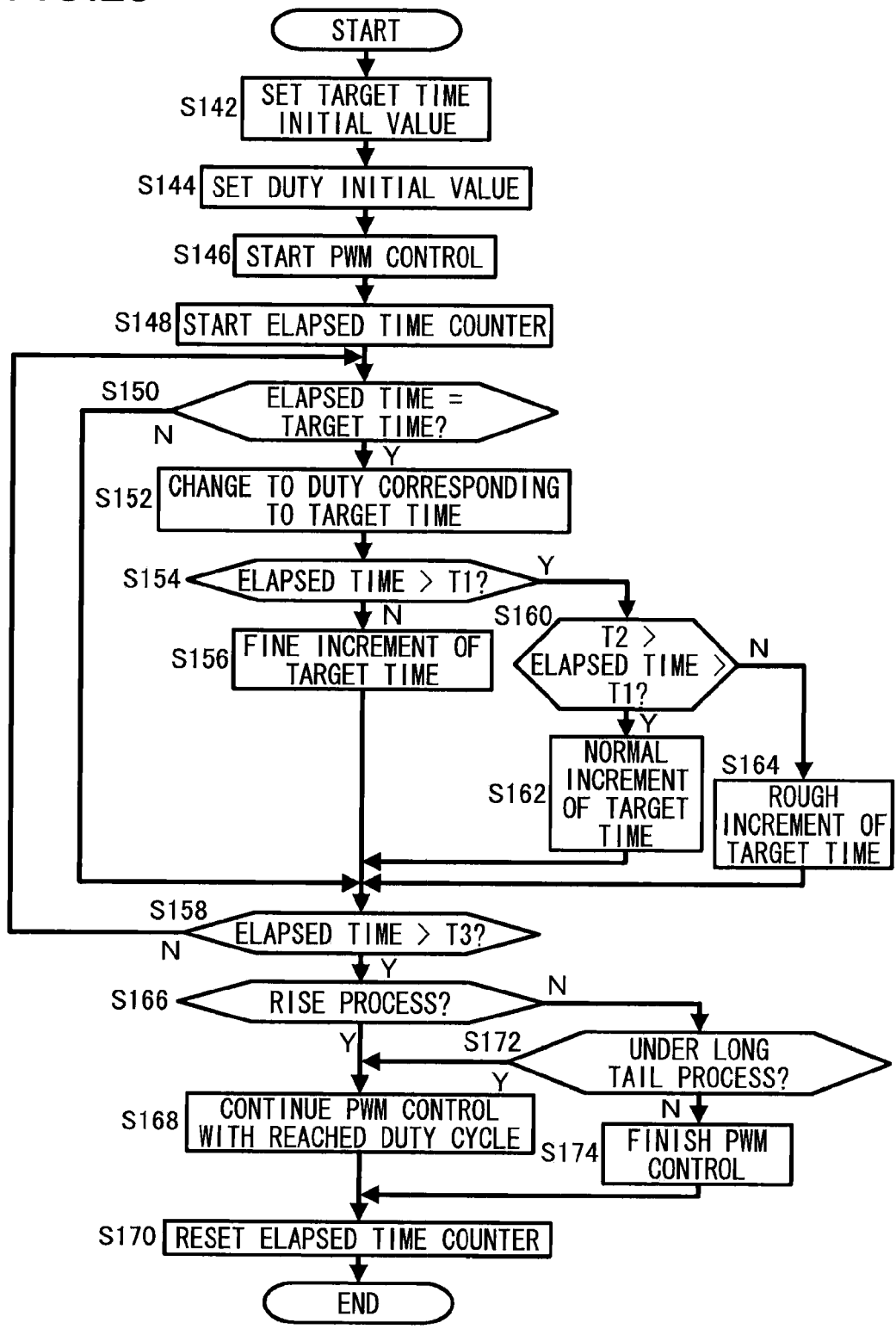
FIG. 28 is a flowchart illustrating details of Steps S120, S124 and S128 in FIG. 27.

FIG. 28 is a flowchart illustrating detail of the rise-fall control process in Step S120, Step S124 and Step S128 of FIG. 27. As described above, the process flow is similar to the rise-fall control process in Example 6 illustrated in FIG. 21. Specifically, Step S142 to Step S158 in FIG. 28 are similar to Step S42 to Step S58 in FIG. 21 and are for performing the PWM control in accordance with the adopted table until the elapsed time reaches T3. For avoiding overlapping description, detail description thereof will be omitted.

FIG. 28 is different from FIG. 21 in the part illustrated in thick characters where the elapsed time reaches T3 in Step S158 and the process goes to Step S166. Specifically, it is checked Step S166 whether or not the elapsed time has reached T3 via the rise process. This case corresponds to the case of reaching t1' or t3' in FIG. 23 or 24. In this case, the process goes to Step 168, and the PWM control is continued with the reached duty. The reached duty is 100% when the process goes from Step S166 to Step S168. Then, the process goes to Step S170, in which the elapsed time counter is reset, and the process flow is finished.

On the other hand, if it is confirmed in Step S166 that the elapsed time has not reached T3 via the rise process step, it means that the elapsed time has reached T3 via the fall process. Therefore, the process goes to Step 172 in which it is checked whether or not the long tail process is being performed. If it is true, the process goes to Step 168, in which the PWM control is continued with a predetermined minimum duty cycle (e.g., 1%) that is the reached duty cycle in this case.

On the other hand, if it is detected in Step S172 that the long tail process is not being performed, it means that the elapsed time has reached T3 in the normal fall process and the duty cycle has reached zero. Therefore, in this case, the process goes to Step S174 in which the PWM control is finished. Then, the process goes to Step S170 in which the elapsed time counter is reset. After that, the process flow is finished.

Figure 29:
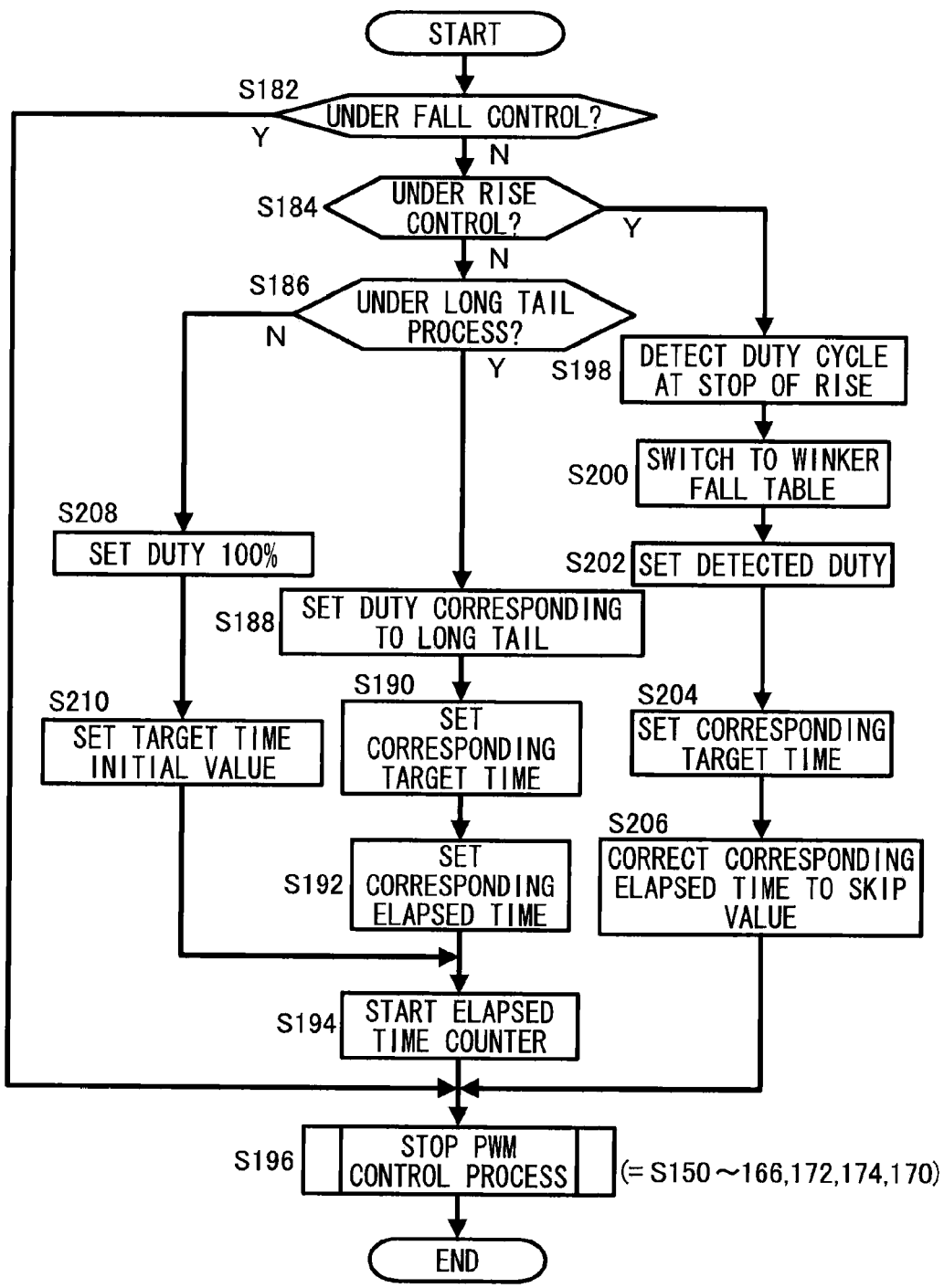
FIG. 29 is a flowchart illustrating a detail of Step S132 in FIG. 27 and an operation for enabling to switch from a rise process to a fall process also in the case where an interrupt of a stop operation occurs at any time point as t50 of symbol B" in FIG. 23.

FIG. 29 is a flowchart illustrating detail of the stop control process in Step S132 of FIG. 27. Note that Step S132 of FIG. 27 is a process generated as a result of stop operation detection performed in Step S121 or Step S126, but the process flow illustrated in FIG. 29 is structured so as to operate in other cases.

In other words, the stop operation interrupt is enabled in Step S88 of the basic process flow of Example 7 illustrated in FIG. 25, but it is possible to detect the stop operation at any time for interrupt, so that the process flow of FIG. 29 is started. However, the case of responding to such the interrupt will be described later. Here, detail of the stop control process in Step S132 of FIG. 27 will be described first with reference to the flowchart of FIG. 29.

After the process from Step S131 to Step S132 in FIG. 27, the process goes to Step 182 in FIG. 29. In this step, it is checked whether or not the stop operation in the fall is detected. In this case, it is not true. Therefore, the process goes to Step 184, and it is checked whether or not the stop operation in the rise is detected. In this case too, it is not true.

Therefore, the process goes to Step S186, and it is checked whether or not the long tail process is being performed.

If it is true, it means that the stop operation is accepted in the period between t2' and t3 as indicated by symbol B'" in FIG. 24. Then, the process goes to Step 188, and the duty corresponding to the long tail process (e.g., 1%) is set. Next, the target time for changing to the next duty cycle corresponding to this is set in Step S190, and the elapsed time until the duty cycle becomes one corresponding to the normal control is set as the initial value of the elapsed time counter in Step S192.

After that, the process goes to Step 194, and the elapsed time counter is started so as to enter a stop PWM control process in Step S196. Detail of this stop PWM control is the same as the process from Step S142 to Step S170 via Step S166, Step S172 and Step S174 in FIG. 28. When the process of the steps is finished, the duty cycle becomes zero and the process flow is finished so that the blink is stopped.

On the other hand, if it is decided that long tail process is not being performed after reaching Step S186 in the state other than the fall or the rise, it means that the stop operation is accepted during the PWM control with the duty of 100% like the period between t1' and t2 or between t3' and t4 as indicated by symbol B in FIG. 23. Therefore, the process goes to Step S208. Then, the duty of 100% is set in Step S208, and the initial value is set at the target time in Step S210. Then, the process goes to Step S194, and the elapsed time counter is started from zero. Thus, the fall control is started promptly without waiting for the fall timing by the intermittent control timer.

The above-described function illustrated in FIG. 29 is the case of the structure in which the stop operation is detected only in the period after one rise-fall control process is completed until the next rise-fall control process is started as illustrated in FIG. 27. In other words, the stop operation is accepted only in the period between t1' and t2 as indicated by symbol B in FIG. 23 or the period between t2' and t3 as indicated by symbol B'" in FIG. 24.

Next, another form of the structure will be described, in which the stop operation interrupt in Step S88 is enabled to detect the stop operation at any time for interrupt, so that the process flow illustrated in FIG. 29 is started.

First, if the interrupt occurs in the fall process so that the process flow illustrated in FIG. 29 starts, it is detected in Step S182 that the rise control is being performed, and the process goes to Step S196 directly. Therefore, the fall control is continued, and the blink is finished when the fall control is finished.

On the other hand, if the interrupt occurs during the rise process so that the process flow of FIG. 29 starts, the process goes from Step S182 to Step S198 via Step S184. In Step S198, the rise control is stopped promptly so that the duty cycle at that time is detected. Then, the process goes to Step S200, and the switching to the winker fall table is performed.

Next, the duty cycle detected in Step S198 is set as the initial value of the fall control in Step S202. Then, the target time in which the duty cycle should be changed next corresponding to the duty cycle set in Step S202 is set in Step S204.

Further, a count value of the current time counter is skipped so as to be the elapsed time until being the duty cycle set in Step S202 in the winker fall table, and the elapsed time is corrected to this skip value in Step S206.

Then, after the above-described process, the process goes to Step S196. Thus, it becomes possible to switch from a midpoint t50 of the rise control as indicated by symbol B" in FIG. 23 to the fall control with the same duty cycle, and it is possible to perform the luminance change control of reaching the duty cycle of 0% at t51 after that.

Figure 30:
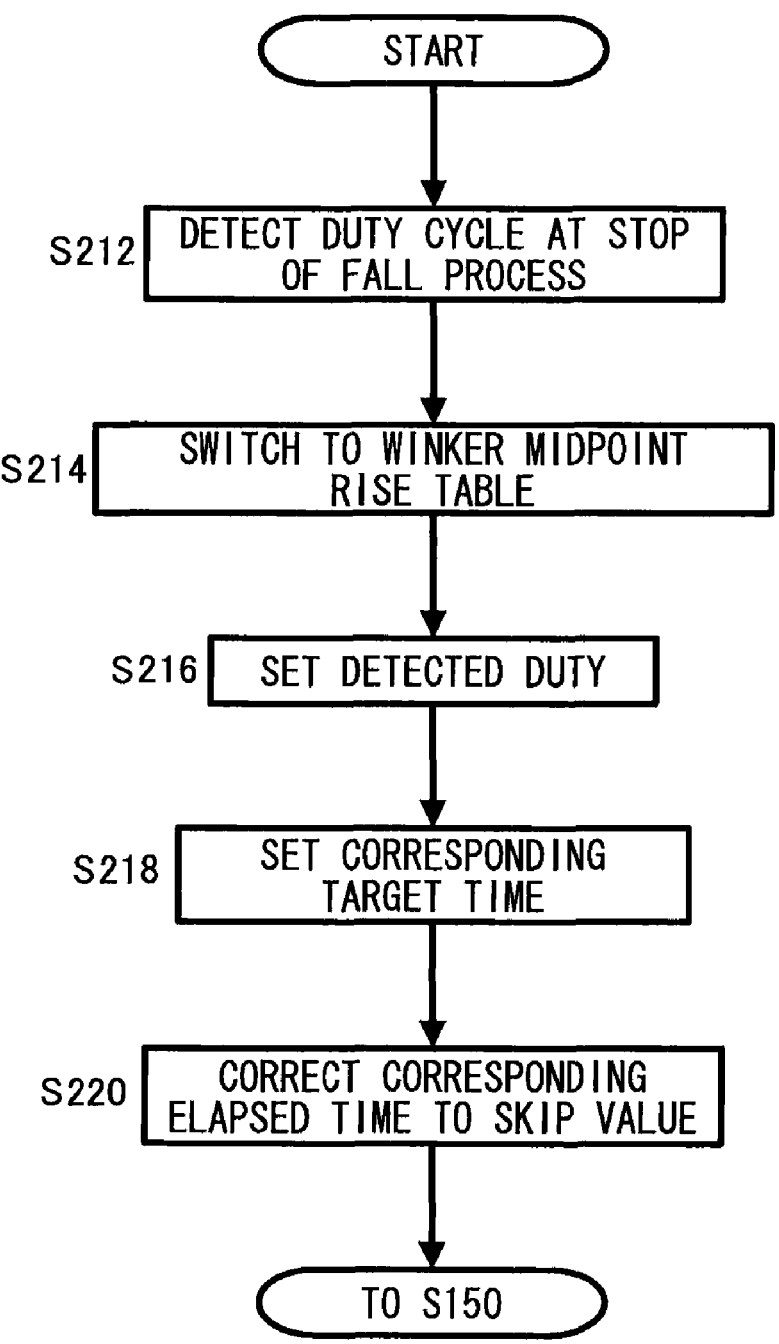
FIG. 30 is a flowchart illustrating an operation when an interrupt of midpoint rise is issued, which is for midpoint transfer from the fall process to the rise process on the turn-on timing as t3 of symbol B' in FIG. 23.

FIG. 30 is a flowchart in the case where the interrupt of midpoint rise that is enabled in Step S90 in the basic process flow illustrated in FIG. 25 occurs, which is for switching to the rise process at t3 in the fall process as indicated by symbol B' in FIG. 23. The contents thereof can be understood basically similarly to Step S198 to Step S206 in FIG. 29.

Specifically, when the interrupt of midpoint rise occurs by the rise timing of the intermittent control timer, the process flow illustrated in FIG. 30 starts. First in Step S212, the fall process is stopped promptly so that the duty cycle at that time is detected. Then, the process goes to Step S214, and switching to the winker midpoint rise table us performed.

Next, the duty cycle detected in Step S212 is set as the initial value of the rise control in Step S216. Then, the target time in which the duty cycle should be changed next corresponding to the duty cycle set in Step S216 is set in Step S218.

Further, a count value of the current time counter is skipped so as to be the elapsed time until being the duty cycle set in Step S216 in the winker rise table, and the elapsed time is corrected to this skip value in Step S220.

Then, after the above-described process, the process goes to Step S150. Thus, in order to perform the control of switching to the rise process at t3 during the fall process as indicated by symbol B' in FIG. 23, the fall timing of the intermittent action timer for the fall control is detected in Step S122 of FIG. 27, and the interrupt is generated in the process flow of FIG. 30 based on the rise timing of the intermittent action timer for the rise control, so that the blink control is performed by repeating the process.

As described above, the present invention provides a light source turn-on/off controller which includes an input section for inputting a turn-on/off timing signal, a emission control signal generating section for generating a control signal for a light source other than a filament to perform light emission so as to simulate a rise or a fall of light emission of the filament in turn-on or turn off of the same corresponding to a rise or a fall of a timing signal and for storing a data table to be a base of the control signal, and a selection signal input section for inputting a selection signal for determining one of the plurality of output sections from which the control signal of the emission control signal generating section should be delivered.

For instance, if an LED is used as the light source other than the filament, the LED responds sensitively to the start and the end of the current supply so as to perform stimulative light energy variation. In contrast, the filament that has been used commonly emits incandescent light by the supplied current and stops the light emission when the filament is cooled after the current supply is stopped. Therefore, in the light energy variation thereof, the rise of light emission has a rounded portion and the fall of the light emission lasts long. Therefore, if the LED is used as a light source that repeats blink like a winker for example, it is stimulative compared with relatively mild blink of the common bulb lamp, and there is an apparent different of feeling between them. Then, this may startle or irritate a driver as a bad psychological influence, and there is no guarantee that it does not cause a traffic accident. The above-described structure of the present invention relieves such the inconvenience.

Further, in the present invention, the data table to be a base of the above-described control is stored in the emission control signal generating section, and one of the plurality of output sections from which the light emission control signal should be output is determined based on an input signal. Thus, fine data of the data table for realizing light emission of the filament that is familiar to people conventionally can be given to a plurality of light sources such as left and right winkers without a feeling of difference. Thus, if any one of the plurality of light sources emits light, similar light emission can be realized, and it is possible to prevent the both light sources from having a slight difference when they blink at the same timing like hazard blink of the winkers.

According to the concrete feature of the present invention, the emission control signal generating section can provide a turn-on/off controller that can generate a control signal having a temporal change of output energy simulating the rise or the fall of light emission of the filament in turn-on or turn-off responding to rise or fall of the timing signal.

More specifically, the emission control signal generating section performs a pulse width modulation for changing the duty cycle so as to simulate energy output variation in the rise or the fall of light emission in turn-on or turn-off of the filament, so that output energy of the control signal has a temporal change. This structure has an advantage that the structure of the pulse width modulation for the LED control can be used, and it is possible to perform the control that simulates turn-on or turn-off of the filament faithfully.

According to another feature of the present invention, a light source turn-on/off controller is provided, which includes an input section of the turn-on/off timing signal, and a emission control signal generating section for generating a control signal for a light source other than a filament to emit light simulating a rise or a fall of light emission in turn-on or turn-off of the filament responding to a rise or a fall of the timing signal. Further, the emission control signal generating section generates the control signal in which output energy of the control signal has a temporal change by passing through an integral circuit having a time constant varying similarly to energy output variation of the rise or the fall of light emission in turn-on or turn-off of the filament. This structure has an advantage that feeling of difference can be relieved by adding a simple structure.

According to another feature of the present invention, a light source turn-on/off controller is provided, which includes an input section of the turn-on/off timing signal, and a emission control signal generating section for generating a control signal for a light source other than a filament to emit light simulating a rise or a fall of light emission in turn-on or turn-off of the filament responding to a rise or a fall of the timing signal. Further, the emission control signal generating section supplies a plurality of control signals to a plurality of light sources respectively, and a delay is provided between the plurality of control signals so that total sum of output energy of the plurality of control signals varies so as to simulate energy output variation of the rise or the fall of light emission in turn-on or turn-off of the filament. For instance, when an LED is used as a light source, a lot of LEDs are used integrally for securing necessary quantity of light. In this case, according to the above-described means, instead of turning on or off all the LEDs simultaneously, a plurality of LEDs are turned on or off sequentially so that a total sum of light quantity of the lot of LEDs varies so as to simulate the energy output variation the rise or the fall of light emission in turn-on or turn-off of the filament.

In the above description, in order to simulate the energy output variation of the rise or the fall of light emission in turn-on or turn-off of the filament, the emission control signal generating section determines an output energy difference between the plurality of control signals based on the energy output variation of the rise or the fall of light emission in turn-on or turn-off of the filament. In addition, instead of this, a delay between the control signals is determined based on the energy output variation of the rise or the fall of light emission in turn-on or turn-off of the filament. These can both be adopted.

Further in the case of the control based on delay between the control signals, more specifically, in turn-off control, the plurality of control signals are delayed in the opposite order to turn-on control. Thus, when the plurality of LEDs are arranged for example, it is possible to control so that they are turned on sequentially from the center and to control so that they are turned off from the periphery. Thus, it is possible to simulate apparent light emission form of the bulb lamp that emits light from the center of the filament and light of the filament last long when it is turned off.

On the other hand, in the case of the control by delay between the plurality of control signals, it is possible to delay the plurality of control signals in the same order as the delay in the turn-on control. In this case, if the plurality of LEDs are turned on or off with delay in the arrangement order, the turned-on region or the turned-off region flows in the same direction. Therefore, it is possible to use the variation of light quantity as a whole can be utilized for instructing turning direction of the right or the left in the winker.

In addition, the present invention provides a light source turn-on/off controller which includes an input section of the turn-on/off timing signal, a PWM signal generating section for generating a pulse signal having the duty cycle that varies so as to simulate the rise or the fall of light emission in turn-on or turn-off of the filament responding to a rise or a fall of the timing signal, an emission control section for controlling an emitting section responding to a pulse signal from the PWM signal generating section, and a storage section for storing different control data tables in the rise and in the fall corresponding to presence or absence of rush current in the filament for duty cycle control by the PWM signal generating section.

Thus, it is possible to give a luminance change by the PWM control simulating light emission of an incandescent lamp or the like considering a difference of light emission characteristic between a light source other than the incandescent lamp such as the LED and the incandescent lamp.

According to another feature of the present invention, a light source turn-on/off controller is provided, which includes an input section of the turn-on/off timing signal, a PWM signal generating section for generating a pulse signal having the duty cycle that varies so as to simulate the rise or the fall of light emission in turn-on or turn-off of the filament responding to a rise or a fall of the timing signal, an emission control section for controlling an emitting section responding to a pulse signal from the PWM signal generating section, and a storage section for storing a control data table obtained by actual measurement of light emission of the emitting section and light emission of the filament with an optical sensor having spectral sensitivity corresponding to human luminosity for the duty cycle control by the PWM signal generating section.

Thus, it is possible to give a luminance change by the PWM control simulating light emission of the incandescent lamp or the like considering a difference of light emission characteristic between a light source other than the incandescent lamp such as the LED and the incandescent lamp and human luminosity in a manner sensible to human eyes.

Specifically, a difference between actual measurement data of the emitting section that emits light based on the control data table initial value and the actual measurement data of the filament is obtained by using the optical sensor, and the control data table initial value is corrected by the difference, which is stored as the control data table.

According to another feature of the present invention, a light source turn-on/off controller is provided, which includes an input section of the turn-on/off timing signal, a PWM signal generating section for generating a pulse signal having the duty cycle that varies so as to simulate the rise or the fall of light emission in turn-on or turn-off of the filament responding to a rise or a fall of the timing signal, an emission control section for performing constant voltage control of an emitting section responding to a pulse signal from the PWM signal generating section, and a storage section for storing a control data table in which an influence of a rounded pulse of a small duty cycle for duty cycle control by the PWM signal generating section.

Thus, an unnatural luminance change due to a rounded pulse of a small duty cycle in the constant current control can be prevented. This is useful in particular for correcting a luminance decrease of the emitting section due to an influence of a rounded pulse at the tail in the fall of emission.

According to another feature of the present invention, a light source turn-on/off controller is provided, which includes an input section of the turn-on/off timing signal, a PWM signal generating section for generating a pulse signal having the duty cycle that varies so as to simulate the rise or the fall of light emission in turn-on or turn-off of the filament responding to a rise or a fall of the timing signal, an emission control section for controlling an emitting section responding to a pulse signal from the PWM signal generating section, a storage section for storing a first control data table for a emission rise control and a second control data table for emission fall control for duty cycle control by the PWM signal generating section, and a control section for switching from control of changing the duty cycle based on one of the first and the second control data table to control of the same duty cycle based on the other control data table. Thus, it is possible to switch between the rise and the fall of the light emission without a skip of the duty cycle.

If this feature is applied to switching to the emission fall control at a midpoint in the emission rise control, the light emission can be stopped at any time. This is useful particularly for stopping blink of a winker naturally when controlling the winker of a vehicle.

On the other hand, if the above-described feature is applied to switching to the emission rise control at a midpoint in the emission fall control, it is possible for example to realize blink of the winker such that the next light emission rises in the state where the previous light emission remains in control of the winker of a vehicle.

According to another feature of the present invention, a light source turn-on/off controller is provided, which includes an input section of the turn-on/off timing signal, a PWM signal generating section for generating a pulse signal having the duty cycle that varies so as to simulate the rise or the fall of light emission in turn-on or turn-off of the filament responding to a rise or a fall of the timing signal, an emission control section for controlling an emitting section responding to a pulse signal from the PWM signal generating section, a storage section for storing a control data table for duty cycle control by the PWM signal generating section, and a control section for controlling the PWM signal generating section to continue the PWM control with a predetermined value when the duty cycle controlled by the control data table reaches the predetermined value.

For instance, the predetermined value is a maximum duty cycle when the rise of the light emission is completed. In addition, the predetermined value is a duty cycle corresponding to the tail in the fall of the light emission in another example. In this case, the duty cycle control in the tail of the light emission rise can be simplified. In addition, in still another example, when the parking brake lamp emitting section is controlled, the predetermined value is the duty cycle for turning on the parking lamp. This corresponds to the control when the brake is released while the parking lamp is turned on.

According to another feature of the present invention, a light source turn-on/off controller is provided, which includes a first input section for receiving a turn-on/off timing signal of a parking lamp of a vehicle, a second input section for receiving a timing signal of depressing or releasing a brake of a vehicle, a PWM signal generating section for generating a pulse signal of a duty cycle for turning on the parking lamp based on a signal from the first input section and for generating a pulse signal having the duty cycle that varies so as to simulate the rise or the fall of light emission in turn-on or turn-off of the filament responding to a rise or a fall of the timing signal, an emission control section for controlling a parking brake lamp emitting section responding to a pulse signal from the PWM signal generating section, and a storage section for storing a control data table for changing the duty cycle between a duty cycle for turning on the parking lamp and a maximum duty cycle based on a timing signal from the second input section in the parking lamp turned-on state for duty cycle control by the PWM signal generating section and a control data table for changing the duty cycle between a minimum duty cycle and the maximum duty cycle based on the timing signal from the second input section in the parking lamp turned-off state. Thus, natural blink can be performed in the brake lamp regardless of presence or absence of turn-on of the parking lamp in the emitting section that works as both the parking lamp and the brake lamp.

In addition, specifically, if the time for changing the duty cycle between the duty cycle for turning on the parking lamp and the maximum duty cycle is set to the same as the time for changing the duty cycle between the minimum duty cycle and the maximum duty cycle, it is possible to simulate light emission of the parking brake lamp emitting section of a double coil type bulb lamp.

According to another feature of the present invention, a light source turn-on/off controller is provided, which includes an input section for receiving a timing signal for blinking a winker of a vehicle, a PWM signal generating section for generating a pulse signal having the duty cycle that varies so as to simulate the rise or the fall of light emission in turn-on or turn-off of the filament responding to a rise or a fall of the timing signal, an emission control section for controlling the winker responding to a pulse signal from the PWM signal generating section, and a control section for determining whether or not the blink of the winker should be continued in the state where there is no change of the duty cycle by the PWM signal generating section. Thus, it is possible to avoid an abrupt stop of the blink of the winker.

According to another feature of the present invention, a light source turn-on/off controller is provided, which includes an input section of a timing signal for blinking a winker of a vehicle, a PWM signal generating section for generating a pulse signal having the duty cycle that varies so as to simulate the rise or the fall of light emission in turn-on or turn-off of the filament responding to a rise or a fall of the timing signal, and an emission control section for controlling the winker responding to a pulse signal from the PWM signal generating section. At a midpoint in the emission fall control by the PWM signal generating section, switching to the emission rise control is performed responding to the timing signal received by the input section, so that the blink of the winker is performed. Thus, the blink of the winker can be realized so that the next light emission rises in the state where the previous light emission remains.

INDUSTRIAL APPLICABILITY

The present invention is useful in an application for relieving a phenomenon that stimulative blink of an LED as a light source used for transmitting any information startle or irritate a person viewing the same. In particular, it is suitable for an application in a traffic-related field such as a vehicle or an electric signal.

The invention claimed is:

1. A light source turn-on/off controller comprising:
   an input section of a turn-on/off timing signal;
   a PWM signal generating section for generating a pulse signal responding to a rise or a fall of the timing signal, a duty cycle of the pulse signal changing so as to simulate a rise or a fall of emission in turn-on or turn-off of a filament;
   an emission control section for controlling an emitting section responding to the pulse signal from the PWM signal generating section; and
   a storage section for storing a control data table for duty cycle control by the PWM signal generating section, wherein
   the control data table includes a rise table to be referred to in the rise of emission and a fall table to be referred to in the fall of emission, and each of the rise table and the fall table indicates association between elapsed time from the rise or the fall of the timing signal and the duty cycle of the pulse signal, and a relationship between the tables indicates that they cannot be superposed on each other.

2. The light source turn-on/off controller according to claim 1, wherein temporal change ratios of the duty cycles set in the rise table and the fall table are not equal to each other when comparing absolute values of them at the start of the rise of light emission and at the start of the fall of the same.

3. The light source turn-on/off controller according to claim 2, wherein contents of the rise table and the fall table are determined by considering a difference between behavior at turn-on of the filament when rush current occurs and behavior at turn-off of the filament when natural cooling occurs.

4. The light source turn-on/off controller according to claim 2, wherein contents of the rise table and the fall table are determined by considering a color temperature variation of the filament and human luminosity.

5. The light source turn-on/off controller according to claim 1, wherein the control data table has contents in which a decrease of luminance in the emitting section due to a rounded portion of the pulse signal in a tail of the fall of emission.

6. The light source turn-on/off controller according to claim 5, wherein the control data table has contents in which an influence of the rounded portion of the pulse signal when the duty cycle is small is corrected.

* * * * *